US012572494B2

(12) United States Patent
Liu

(10) Patent No.: US 12,572,494 B2
(45) Date of Patent: Mar. 10, 2026

(54) SYSTEM AND METHOD OF TRANSMITTING A SIGNAL

(71) Applicant: SUZHOU METABRAIN INTELLIGENT TECHNOLOGY CO., LTD., Suzhou (CN)

(72) Inventor: Yang Liu, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 19/124,448

(22) PCT Filed: Aug. 16, 2024

(86) PCT No.: PCT/CN2024/112595
§ 371 (c)(1),
(2) Date: Apr. 25, 2025

(87) PCT Pub. No.: WO2025/066651
PCT Pub. Date: Apr. 3, 2025

(65) Prior Publication Data
US 2026/0010504 A1 Jan. 8, 2026

(30) Foreign Application Priority Data
Sep. 25, 2023 (CN) .......................... 202311242768.5

(51) Int. Cl.
*G06F 13/40* (2006.01)
*G06F 1/06* (2006.01)
*H04Q 11/04* (2006.01)

(52) U.S. Cl.
CPC ............ *G06F 13/4068* (2013.01); *G06F 1/06* (2013.01); *H04Q 11/04* (2013.01); *H04Q 2213/13292* (2013.01)

(58) Field of Classification Search
None
See application file for complete search history.

(56) References Cited

U.S. PATENT DOCUMENTS

| 2017/0161137 | A1 | 6/2017 | Wang | |
| 2020/0065273 | A1* | 2/2020 | Bouda | G06F 13/4282 |
| 2020/0117568 | A1* | 4/2020 | Cheng | G06F 11/3037 |

FOREIGN PATENT DOCUMENTS

| CN | 107729220 A | 2/2018 |
| CN | 112069766 A | 12/2020 |

(Continued)

OTHER PUBLICATIONS

The search report of CN application No. 202311242768.5 issued on Nov. 6, 2023.

(Continued)

*Primary Examiner* — Idriss N Alrobaye
*Assistant Examiner* — Dayton Lewis-Taylor
(74) *Attorney, Agent, or Firm* — Scully, Scott, Murphy & Presser, P.C.

(57) ABSTRACT

A system and method of transmitting signals are provided. The method includes: acquiring a Virtual Pin Port (VPP) lighting signal and a Serial General Purpose Input/Output (SGPIO) lighting signal by a server motherboard, a hard disk backplane being deployed with a target logic device and a set of hard disk slots; and scheduling and switching the VPP lighting signal and the SGPIO lighting signal in an orderly time-division way by using a preset time-division multiplexing manner, so as to transmit the VPP lighting signal and the SGPIO lighting signal to the target logic device through a same lighting cable.

20 Claims, 5 Drawing Sheets

(56) References Cited

FOREIGN PATENT DOCUMENTS

| CN | 112463667 A | 3/2021 |
| CN | 113190084 A | 7/2021 |
| CN | 113742182 A | 12/2021 |
| CN | 115905083 A | 4/2023 |
| CN | 115981971 A | 4/2023 |
| CN | 116991685 A | 11/2023 |

OTHER PUBLICATIONS

The search report of PCT application No. PCT/CN2024/112595 issued on Oct. 23, 2024.
The first office action of CN application No. 202311242768.5 issued on Nov. 7, 2023.
Extended Supplementary European Search Report dated Dec. 23, 2025 received in European Application No. 1 24870199.7.

* cited by examiner

Time-division multiplexing physical layer

Time-division multiplexing channel layer

Data calculation of data layer:

SGPIO:$T_1 = 1*4*3bit/100kHZ = 12us$

VPP:$T_2 = 1*16*16bit/100kHZ = 256us$

Complete a transmission of VPP and SGPIO code streams:

$T_{max} = T_1 + T_2 + 100ms = 100.262ms \approx 100ms$

Time-division multiplexing data layer

Fig. 8

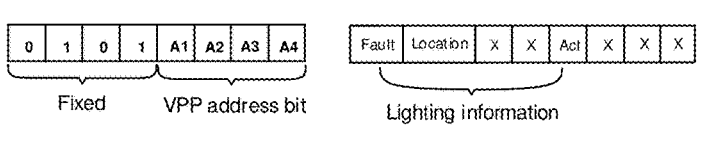

| 0 | 1 | 0 | 1 | A1 | A2 | A3 | A4 |

| Fault | Location | X | X | Act | X | X | X |

Fixed    VPP address bit    Lighting information

VPP lighting code stream

Fig. 9 acquiring a Virtual Pin Port (VPP) lighting signal and a Serial General Purpose Input/ Output (SGPIO) lighting signal to be transmitted to a target logic device on a hard disk backplane, wherein the target logic device is a logic device configured to control a hard disk inserted into a hard disk slot in a set of hard disk slots on the hard disk backplane, the VPP lighting signal is a lighting signal corresponding to a Non Volatile Memory express (NVMe) hard disk inserted into a hard disk slot in the set of hard disk slots, and the SGPIO lighting signal is a lighting signal corresponding to a Serial Advanced Technology Attachment (SATA) hard disk inserted into a hard disk slot in the set of hard disk slots

S902 scheduling and switching the VPP lighting signal and the SGPIO lighting signal in an orderly time-division way by using a preset time-division multiplexing manner, so as to transmit the VPP lighting signal and the SGPIO lighting signal to the target logic device through a same lighting cable, wherein the preset time-division multiplexing manner comprises: continuously detecting the VPP lighting signal and the SGPIO lighting signal within a time-division multiplexing cycle, performing identification and determination according to waveform characteristics of the VPP lighting signal and the SGPIO lighting signal, sampling the VPP lighting signal and the SGPIO lighting signal which are continuously sent, and switching the VPP lighting signal and the SGPIO lighting signal to be alternately transmitted to a time-division multiplexing channel according to one or more specific flag bits of the VPP lighting signal and the SGPIO lighting signal and a preset specific rule

S904

SYSTEM AND METHOD OF TRANSMITTING A SIGNAL

CROSS-REFERENCE TO RELATED APPLICATION

The disclosure claims priority to Chinese Patent Application No. 202311242768.5, filed to the China National Intellectual Property Administration on Sep. 25, 2023 and entitled "System and Method of Transmitting A Signal", the disclosure of which is hereby incorporated by reference in its entirety.

TECHNICAL FIELD

Embodiments of the present disclosure relate to the field of computers, and in particular, to a system and method of transmitting a signal.

BACKGROUND

On some servers, due to business requirements, hard disk slots of a hard disk backplane need to support a plurality of different types of hard disks at the same time. For example, an any bay slot may support the insertion of NVMe (Non Volatile Memory Express)/SATA (Serial Advanced Technology Attachment)/SAS (Serial Attached SCSI (Small Computer System Interface)) and other types of hard disks. Taking the installation of the hard disk on a front window of the server as an example, a plurality of hard disk backplanes with the hard disk slots supporting the plurality of different types of hard disks are usually spliced.

On a hard disk bracket, there are usually Light-Emitting Diode (LED) indicator lamps, which are configured to visually represent a status of the current hard disk. On the hard disk backplane with the hard disk slots supporting the plurality of different types of hard disks, a hard disk controller on a server motherboard may send status information of the current hard disk to the hard disk backplane in a specific bus form, and a logic device on the hard disk backplane parses a bus signal and lights the indicator lamp of the corresponding hard disk according to a parsing result. For example, each hard disk backplane with the any bay slot requires a set of Peripheral Component Interconnect Express (PCIE) cables and a corresponding set of Virtual Pin Port (VPP) low-speed lighting cables, as well as a set of SATA high-speed cables and a corresponding set of Serial General Purpose Input/Output (SGPIO) low-speed lighting cables, and the two sets of low-speed lighting cables are configured to send the status information of the current hard disk to light the corresponding hard disk indicator lamp. For a server with the plurality of hard disk backplanes, an excessive number of cables connected to the hard disk backplane results in excessively high material cost.

It can be seen that there is a problem of high signal transmission cost caused by the excessive number of cables connected to the hard disk backplane in the related art.

SUMMARY

Embodiments of the present disclosure provide a system and method of transmitting a signal, so as to at least solve the problem of high signal transmission cost caused by an excessive number of cables connected to a hard disk backplane in the related art.

According to a first aspect of the embodiments of the present disclosure, a system of transmitting a signal is provided, including: a server motherboard and a hard disk backplane, wherein the hard disk backplane is deployed with a target logic device and a set of hard disk slots, the target logic device is a logic device configured to control a hard disk inserted into each hard disk slot within the set of hard disk slots, and the server motherboard is connected to the hard disk backplane through a cable, wherein, the server motherboard is configured to acquire a Virtual Pin Port (VPP) lighting signal to be transmitted to the target logic device and a Serial General Purpose Input/Output (SGPIO) lighting signal to be transmitted to the target logic device, wherein the VPP lighting signal is a lighting signal corresponding to a Non Volatile Memory express (NVMe) hard disk inserted into a hard disk slot in the set of hard disk slots, and the SGPIO lighting signal is a lighting signal corresponding to a Serial Advanced Technology Attachment (SATA) hard disk inserted into a hard disk slot in the set of hard disk slots; and the server motherboard is configured to schedule and switch the VPP lighting signal and the SGPIO lighting signal in an orderly time-division way by using a preset time-division multiplexing manner, so as to transmit the VPP lighting signal and the SGPIO lighting signal to the target logic device through a same lighting cable, wherein the preset time-division multiplexing manner comprises: continuously detecting waveform of a lighting signal to be transmitted to the target logic device within a time-division multiplexing cycle, identifying the waveform based on waveform characteristics of the VPP lighting signal and the SGPIO lighting signal to determine whether the lighting signal to be transmitted to the target logic device is the VPP lighting signal or the SGPIO lighting signal, sampling the VPP lighting signal and the SGPIO lighting signal which are continuously sent, and switching the VPP lighting signal and the SGPIO lighting signal to be alternately transmitted to a time-division multiplexing channel according to one or more specific flag bits of the VPP lighting signal and the SGPIO lighting signal and a preset specific rule; and the target logic device is configured to receive the VPP lighting signal and the SGPIO lighting signal, which are transmitted by the server motherboard through the lighting cable, by using the preset time-division multiplexing manner, and the target logic device is configured to control a display status of a status indicator lamp corresponding to the NVMe hard disk inserted into a hard disk slot in the set of hard disk slots based on the VPP lighting signal, and control a display status of a status indicator lamp corresponding to the SATA hard disk inserted into a hard disk slot in the set of hard disk slots based on the SGPIO lighting signal.

According to a second aspect of the embodiments of the present disclosure, a method of transmitting a signal is provided, including: acquiring a Virtual Pin Port (VPP) lighting signal and a Serial General Purpose Input/Output (SGPIO) lighting signal to be transmitted to a target logic device on a hard disk backplane, wherein the target logic device is a logic device configured to control a hard disk inserted into a hard disk slot in a set of hard disk slots on the hard disk backplane, the VPP lighting signal is a lighting signal corresponding to a Non Volatile Memory express (NVMe) hard disk inserted into a hard disk slot in the set of hard disk slots, and the SGPIO lighting signal is a lighting signal corresponding to a Serial Advanced Technology Attachment (SATA) hard disk inserted into a hard disk slot in the set of hard disk slots; and scheduling and switching the VPP lighting signal and the SGPIO lighting signal in an orderly time-division way by using a preset time-division multiplexing manner, so as to transmit the VPP lighting signal and the SGPIO lighting signal to the target logic device through a same lighting cable, wherein the preset time-division multiplexing manner comprises: continuously detecting the VPP lighting signal and the SGPIO lighting signal within a time-division multiplexing cycle, performing identification and determination according to waveform characteristics of the VPP lighting signal and the SGPIO lighting signal, sampling the VPP lighting signal and the SGPIO lighting signal which are continuously sent, and switching the VPP lighting signal and the SGPIO lighting signal to be alternately transmitted to a time-division multiplexing channel according to one or more specific flag bits of the VPP lighting signal and the SGPIO lighting signal and a preset specific rule.

Through the embodiments of the present disclosure, for the VPP lighting signal and the SGPIO lighting signal to be transmitted to the hard disk backplane, the VPP lighting signal and the SGPIO lighting signal are scheduled and switched in an orderly time-division way by using a preset time-division multiplexing manner, so as to transmit the VPP lighting signal and the SGPIO lighting signal to the target logic device of the hard disk backplane through the same physical lighting cable, thereby controlling the NVMe hard disk and the SATA hard disk. Compared with a method of respectively transmitting the VPP lighting signal and the SGPIO lighting signal by using individual physical cables, the number of cables connected to the hard disk backplane may be reduced. At the same time, the VPP lighting signal and the SGPIO lighting signal are scheduled and switched in an orderly time-division way by using a preset time-division multiplexing manner, which may ensure that the VPP lighting signal and the SGPIO lighting signal are timely and accurately transmitted to the target logic device of the hard disk backplane, thereby achieving the technical effect of reducing the signal transmission cost and improving the accuracy of signal transmission, and solving the problem of high signal transmission cost caused by an excessive number of cables connected to the hard disk backplane in the related art.

BRIEF DESCRIPTION OF THE DRAWINGS

FIG. 8 is a schematic diagram of a VPP lighting code stream according to an embodiment of the present disclosure.

FIG. 9 is a schematic flowchart of a method of transmitting a signal according to an embodiment of the present disclosure.

DETAILED DESCRIPTION OF THE EMBODIMENTS

Embodiments of the present disclosure are described below with reference to the drawings and in conjunction with the embodiments in detail.

It is to be noted that terms "first", "second", etc., in the specification, claims and the above drawings of the embodiments the present disclosure are used for distinguishing similar objects rather than describing a specific sequence or a precedence order.

Figure 1:
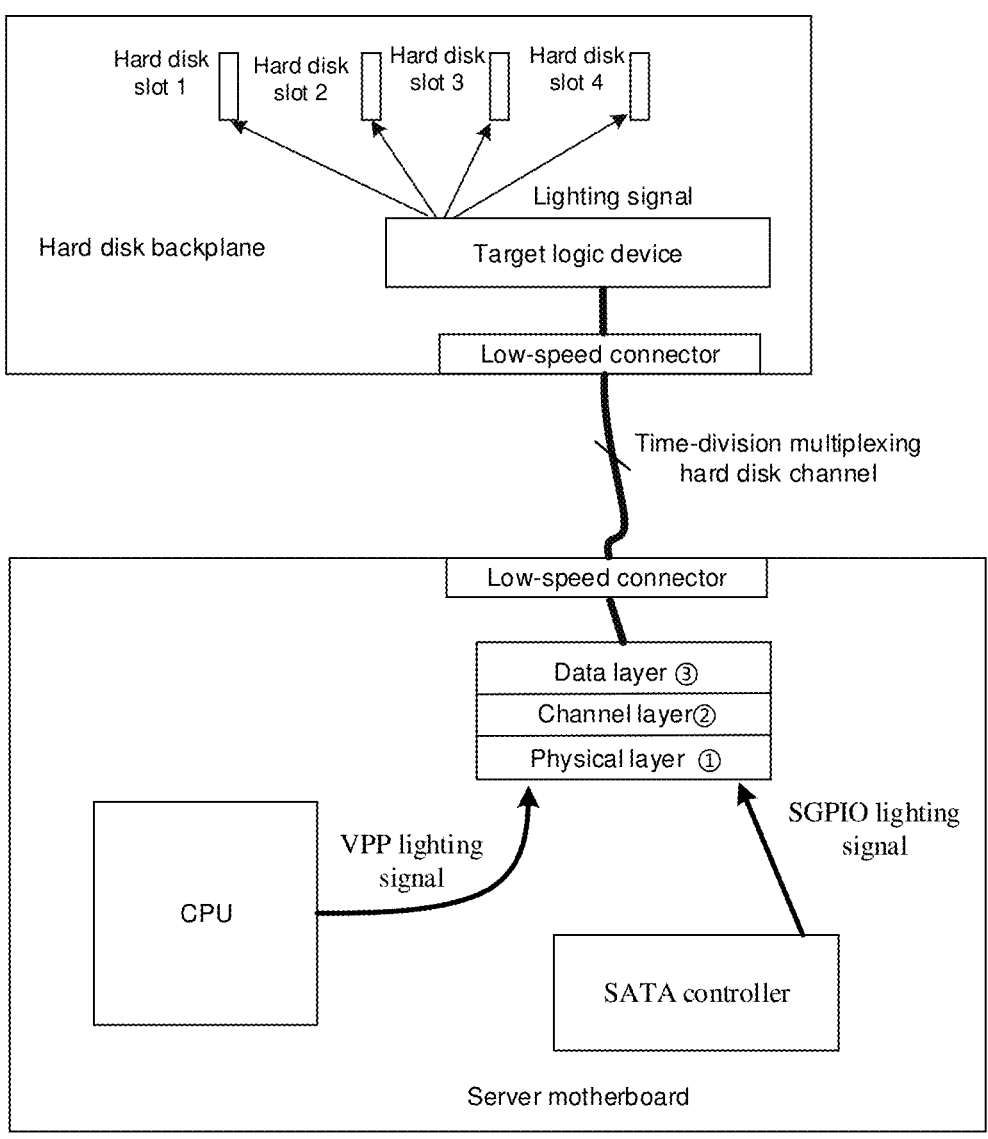
FIG. 1 is a structural block diagram of hardware of an optional system of transmitting a signal according to an embodiment of the present disclosure.

According to one aspect of the embodiments of the present disclosure, a system of transmitting a signal is provided, which may be applied in a server or a similar computing apparatus. Taking the application in the server as an example, as shown in FIG. 1, the system of transmitting a signal includes: a server motherboard and a hard disk backplane. The server motherboard is connected to the hard disk backplane through a cable. The hard disk backplane is provided with a target logic device and a set of hard disk slots, and the target logic device is a logic device configured to control hard disks inserted into the set of hard disk slots, which may be a Complex Programmable Logic Device (CPLD).

The hard disk backplane may be a hard disk backplane located at a front window or a rear window of the server, and may be a single hard disk backplane or a hard disk backplane formed by splicing a plurality of hard disk backplanes. Each hard disk slot (i.e., the hard disk slot) on the hard disk backplane allows one or more types of hard disks to be inserted. The hard disks commonly used in the server may include an NVMe hard disk, a SATA hard disk, an SAS hard disk, and other types of hard disks. On some servers, in order to meet business requirements, the hard disk backplane may be provided with the hard disk slots supporting the insertion of a plurality of different types of hard disks, for example, a hard disk slot supporting NVMe/SATA/SAS and other hard disks at the same time is called an any bay hard disk slot, or an any bay slot for short. Correspondingly, the hard disk backplane may be an any bay hard disk backplane.

For example, taking the installation of the hard disk on the front window of the server as an example, the plurality of hard disk backplanes with the any bay slots are usually spliced together, and the server motherboard is connected to the hard disk backplane on the front window of the server through a cable, so as to transmit a high-speed data signal, a low-speed control signal, etc.

For each type of hard disk, hard disk information (such as NVMe hard disk information and SATA hard disk information) of one or more hard disks of the hard disk type corresponding to each controller may be acquired through different controllers on the server motherboard, a corresponding control signal set (such as a VPP lighting signal and an SGPIO lighting signal) is generated based on the acquired hard disk information, and each generated control signal set is sent to a target processing unit (such as a time-division multiplexing encoding/decoding unit), and transmitted to the target logic device by the target processing unit through a physical cable between the target processing unit and the hard disk backplane, so as to control at least some of the hard disks on the hard disk backplane. The control may be a direct control of the hard disk or a control of a status indicator lamp corresponding to the hard disk.

The target processing unit may be arranged on the server motherboard and may be implemented by the CPLD, that is, the target processing unit may be the CPLD.

In the present embodiment, the hard disk backplane may further be provided with the status indicator lamp corresponding to each hard disk, and the status indicator lamp may be an LED indicator lamp. The server motherboard may transmit the lighting signal to the target logic device to control display statuses of the status indicator lamps corresponding to at least some of the hard disks on the hard disk backplane. The lighting signal here may include the VPP lighting signal and the SGPIO lighting signal, and may further include other types of lighting signals, which are not limited here. The target processing unit may acquire the VPP lighting signal and the SGPIO lighting signal to be transmitted to the target logic device. The VPP lighting signal may be sent to the target processing unit by a first controller, and the SGPIO lighting signal may be sent to the target processing unit by a second controller, as shown in FIG. 1.

Here, the VPP lighting signal is a control signal set corresponding to the NVMe hard disk inserted in the set of hard disk slots, and the SGPIO lighting signal is a control signal set corresponding to the SATA hard disk inserted in the set of hard disk slots. The control of the NVMe hard disk or the SATA hard disk may be a direct control of the hard disk of the type, or a control of the status indicator corresponding to the hard disk of the type. Although the present embodiment is described in a scenario where the status indicator lamp is controlled, the provided system of transmitting a signal is also applicable to other control scenarios without contradiction.

In the present embodiment, on the hard disk backplane with the hard disk slots supporting the insertion of the plurality of different types of hard disks, a hard disk controller on the server motherboard may send status information of the hard disk to the hard disk backplane in a specific bus form, and the target logic device (e.g., the logic device) on the hard disk backplane parses a bus signal and lights the status indicator lamp of the corresponding hard disk according to a parsing result, so as to visually indicate the status of the current hard disk. The status indicator lamps corresponding to the hard disks include an Active (active status) lamp configured to indicate an inserted status and the active status of the hard disk, and a Fault (fault) and Locate (location) lamp that is configured to indicate whether the current hard disk has fault reporting, and display a hard disk location status, a hard disk rebuild status, etc.

Figure 2:
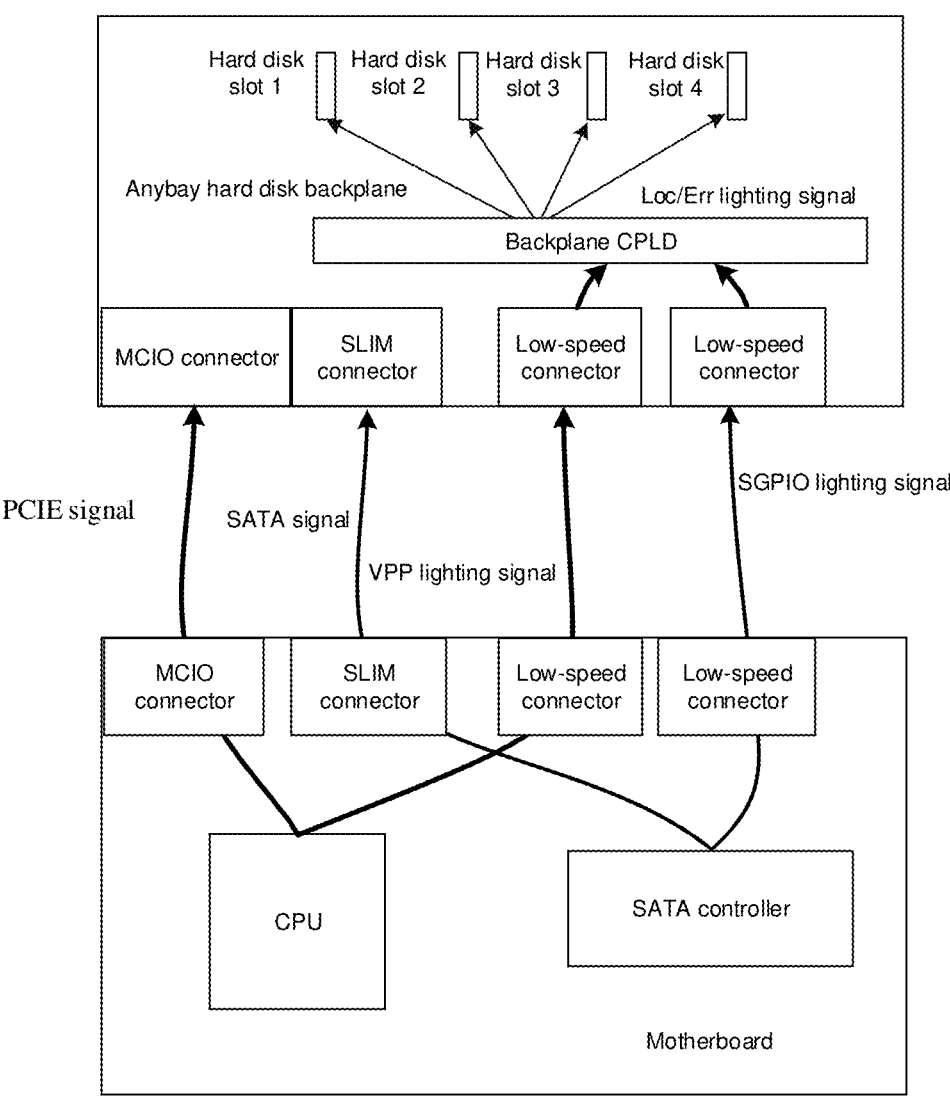
FIG. 2 is a schematic diagram of a cable connection between a server motherboard and a hard disk backplane according to an embodiment of the present disclosure.

Taking the hard disk backplane with the any bay slot (i.e., any bay hard disk backplane) as an example, a cable connection between the server motherboard and the hard disk backplane is shown in FIG. 2. A Central Processing Unit (CPU) on the server motherboard sends a PCIE signal, and transmits the PCIE signal to the hard disk backplane by using a high-speed Mini Cool Edge Input/Output (MCIO) connector through a high-speed cable, so as to support a data link of the NVMe hard disk.

The lighting signal of the NVMe hard disk (i.e., the VPP lighting signal) is sent by the CPU on the server motherboard through a VPP bus, and the VPP lighting signal is transmitted to the CPLD on the hard disk backplane by using a low-speed connector through a low-speed cable. A SATA controller on the server motherboard sends a SATA signal, which is led out using a high-speed Slimline (SLIM) connector and connected to the hard disk backplane through the high-speed cable, so as to support a data link of the SATA hard disk. The lighting signal of the SATA hard disk (i.e., the SGPIO lighting signal) is sent by the SATA controller through an SGPIO bus, and is connected to the CPLD on the hard disk backplane by using the low-speed connector through the low-speed cable. On the connector of the hard disk backplane with the any bay slot, both a PCIE high-speed data signal and an SATA high-speed data signal (not shown in FIG. 2) exist at the same time. The CPLD on the hard disk backplane may determine whether the hard disk type of the currently inserted hard disk is the NVMe hard disk or the SATA hard disk, parse the corresponding VPP lighting signal or SGPIO lighting signal, map the parsed information to the corresponding lighting signal, and perform lighting processing on the corresponding indicator lamp.

However, each hard disk backplane requires a plurality of cables to connect to the server motherboard and is configured to transmit the high-speed data signal and the low-speed control signal. For example, each any bay hard disk backplane requires a set of PCIE high-speed cables and a corresponding set of VPP low-speed lighting cables, as well as a set of SATA high-speed cables and a corresponding set of SGPIO low-speed lighting cables, resulting in an excessive number of cables connecting the hard disk backplane supporting the any bay slot to the motherboard in the server, which adds additional difficulty in design, installation and maintenance, and causes a sharp increase in material cost.

For example, a server model with sixteen 2.5-inch hard disks on the front window is usually formed by splicing four 4-port hard disk backplanes, and the cables connected to the hard disk backplanes are very complicated. If the hard disk backplane is also installed on the rear window of the server, the cables between a server host and the hard disk backplane may be more complicated. Overly complicated cables are difficult to install and maintain, which may result in excessively high material cost.

In order to at least partially solve the problem of overly complicated cables between the server host and the hard disk backplane, for the VPP lighting signal and SGPIO lighting signal to be transmitted to the hard disk backplane, the VPP lighting signal and the SGPIO lighting signal can be scheduled and switched in an orderly time-division way by using a preset time-division multiplexing manner, so as to transmit the VPP lighting signal and the SGPIO lighting signal to the logic device of the hard disk backplane through the same physical cable, thereby controlling the NVMe hard disk and the SATA hard disk. Compared with a method of respectively transmitting the VPP lighting signal and the SGPIO lighting signal by using individual physical cables, the number of cables connected to the hard disk backplane may be reduced. At the same time, the VPP lighting signal and the SGPIO lighting signal are scheduled and switched in an orderly time-division way by using a preset time-division multiplexing manner, which may ensure that the VPP lighting signal and the SGPIO lighting signal are timely and accurately transmitted to the logic device of the hard disk backplane, thereby reducing the difficulty in cable design, installation, and operation and maintenance while ensuring the reliability of signal transmission, and reducing the cost of the server.

Here, time-division multiplexing means that the entire transmission time is divided into a plurality of time periods in the same physical channel, and each signal occupies a different part of the time period. At a certain moment, there is only one signal on the physical channel. Each time period may be called a time slot, there is no overlap between different time slots, and different signals may be transmitted in different time slots. In short, each of a plurality of tasks is divided into the plurality of time periods, and then the different time periods of each task are used crosswise to achieve the simultaneous operation of the plurality of tasks, thereby achieving the purpose of transmitting a plurality of signals by using a single channel. The operation of scheduling and switching the VPP lighting signal and the SGPIO lighting signal in an orderly time-division way by using the preset time-division multiplexing manner includes: continuously detecting the VPP lighting signal and the SGPIO lighting signal within a time-division multiplexing cycle, performing identification and determination according to respective waveform characteristics, sampling the VPP lighting signal and the SGPIO lighting signal which are continuously sent, and according to specific flag bits of the signals and a preset specific rule, alternately switching the VPP lighting signal and the SGPIO lighting signal to a time-division multiplexing channel. The preset specific rule here is configured to indicate a scheduling order of the VPP lighting signal and the SGPIO signal.

It is to be noted that, although in some embodiments of the present disclosure, the system of transmitting a signal in the present embodiment is explained by taking the server provided with the hard disk backplane (e.g., the any bay hard disk backplane) having the hard disk slots supporting the plurality of different types of hard disks as an example, the system of transmitting a signal in the present embodiment and the applied server are not limited, and the system of transmitting a signal may also be applied to other servers or similar devices. The control signal set for controlling a certain type of hard disk may include one or more types of control signals, and the control signals in the same control signal set may jointly control one hard disk or hard disks of one type.

Optionally, the physical cables between the server motherboard and the hard disk backplane may include the high-speed cable and the low-speed cable. Considering that the high-speed cable configured to transmit the high-speed data signal is a necessary path for data communication between the server motherboard and the hard disk backplane, and cannot be reduced or the cost of reduction is high, the same physical cable for transmitting the VPP lighting signal and the SGPIO lighting signal may be the low-speed cable.

For example, for the physical cables between the server motherboard and the hard disk backplane shown in FIG. 2, the PCIE high-speed cable and the SATA high-speed cable are necessary paths for data communication between the server motherboard and the hard disk backplane, and cannot be reduced. However, due to the particularity of the any bay hard disk backplane, in actual applications, different types of hard disks may be inserted into each any bay slot, it is very likely that NVMe hard disk and the SATA hard disks may coexist, and the status of each hard disk needs to be displayed and updated in real time. Therefore, the logic on the hard disk backplane needs to receive, interpret and process the VPP signal and the SGPIO signal (i.e., the VPP lighting signal and the SGPIO lighting signal) at the same time. Therefore, the VPP lighting cable and the SGPIO lighting cable may be reduced.

Here, although a hard disk status is sent by using different protocols to light the hard disk, there are still some similarities between the VPP bus and the SGPIO bus. For example, the basic bus forms of the two buses are similar, both containing one clock signal and one data signal, supplemented by the respective status signals. The VPP bus is based on a System Management Bus (SMBUS), and the status signal is Alert (alert signal). In addition to the clock signal and the data signal, the SGPIO bus has an SLOAD signal (status signal) to indicate a starting status of a set of VPP signal transmissions. In addition, the ranges of clock frequencies supported by the two buses are also approximately the same, with overlapping frequency ranges. These basic conditions make it possible to multiplex the VPP signal and the SGPIO signal.

If the VPP signal and the SGPIO signal are multiplexed on the same physical cable, the physical cable needs to be able to transmit both the VPP and SGPIO signals at the same time, or transmit the two signals alternately at the fastest possible frequency. When the frequency (or the number of times) at which the CPLD on the hard disk backplane receives each of the VPP signal and the SGPIO signal within a certain time period is greater than the frequency (or the number of times) at which the hard disk status updates the corresponding information required, the signal sampling, reception and processing can be completed without loss, and the function of lighting different types of hard disks can be completed at the same time.

For example, for the server supporting the any bay hard disk backplane, since the hard disk backplane needs to support the NVME hard disk and the SATA hard disk at the same time, the lighting cables of the NVME hard disk and the SATA hard disk may be combined into a time-division multiplexing signal band, so as to reduce the number of lighting signals, and the VPP lighting signal and SGPIO lighting signal are sent at the same time in the time-division multiplexing signal band by using the time-division multiplexing manner. A unique scheduling mechanism is used to sample, switch and transmit the VPP and SGPIO buses at the same time, without the need for additional software adaptation of the host controller. Through the above method, the difficulty in design, installation, operation and maintenance is greatly reduced, and the material cost of the server is effectively reduced.

Figure 3:
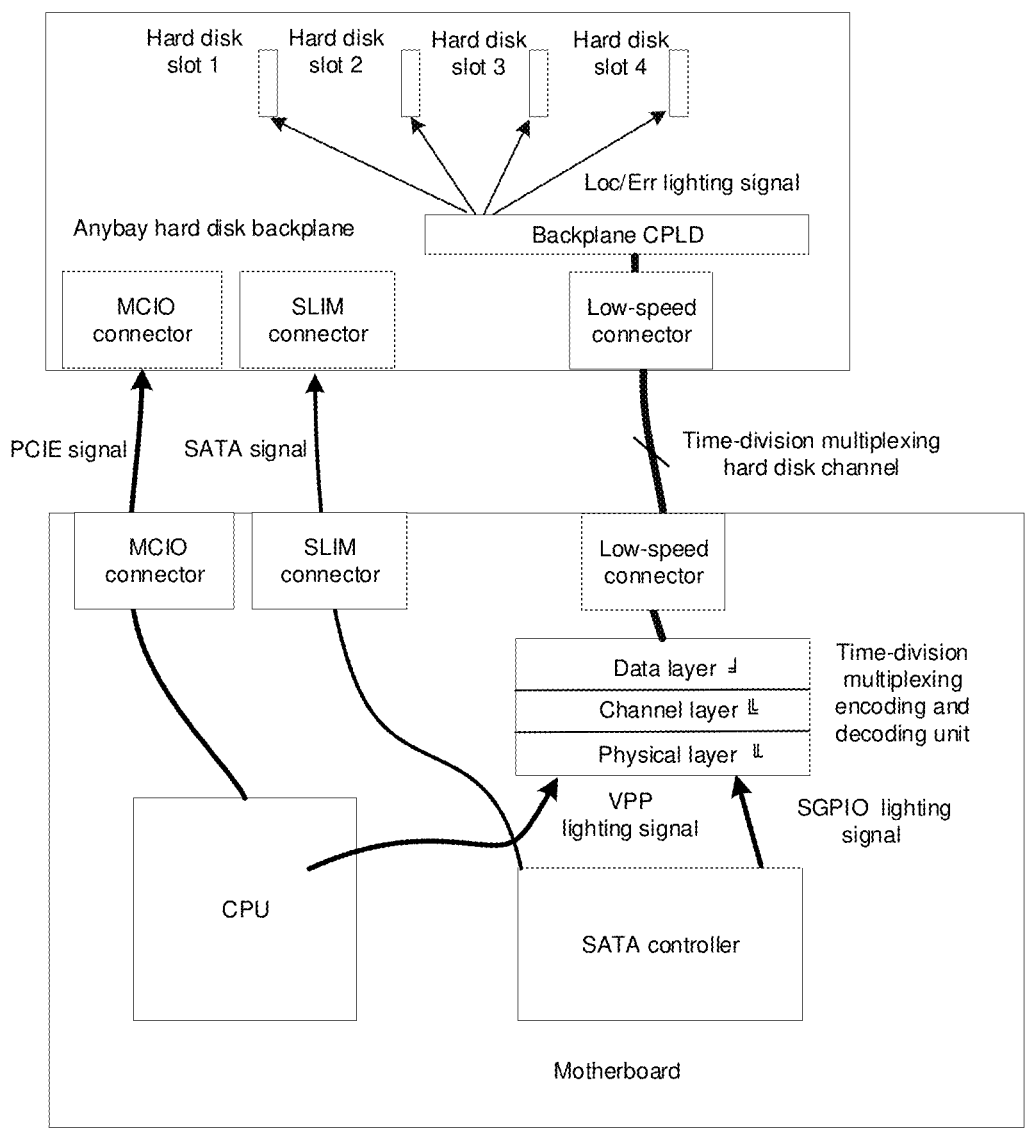
FIG. 3 is a schematic diagram of another cable connection between a server motherboard and a hard disk backplane according to an embodiment of the present disclosure.

As shown in FIG. 3, the PCIE high-speed cable and the SATA high-speed cable are respectively led out from respective controllers and are connected to the hard disk backplane through the high-speed cables. However, the VPP lighting cable of the NVMe hard disk and the SGPIO lighting cable of the SATA hard disk, after being directly led out from respective controllers, are not directly led out to the outside, but are connected to the time-division multiplexing encoding/decoding processing unit (or the time-division multiplexing encoding and decoding unit, i.e., the target processing unit) on the motherboard. The processing unit leads out an independent low-speed cable to the hard disk backplane as a time-division multiplexing hard disk channel. Therefore, the original two independent VPP and SGPIO cables are replaced with a time-division multiplexing hard disk channel low-speed cable (which may be the lighting cable), and the number of cables and signals are reduced to half of the original. Compared with before, each server may reduce the use of at least four or even more low-speed cables depending on different models.

Through the above method, the VPP lighting signal and the SGPIO lighting signal are sent in the time-division multiplexing channel by using the time-division multiplexing manner, and the unique scheduling mechanism is used to sample, switch and transmit the VPP signal and the SGPIO signal, without the need for additional software adaptation of the host controller, which effectively reduces the number of cables inside the server. For example, a common server supporting a front 16*2.5-inch hard disk often has four hard disk backplanes, so that a single server may reduce four cables. If the server has a rear hard disk, more additional cables may be reduced.

At the same time, the reduction in the number of physical cables may greatly reduce the difficulty in design, installation, and operation and maintenance, and effectively reduce the material cost of the server: from a design perspective, the reduction in the number of cable designs may reduce the design burden; from a production perspective, fewer cables may reduce the difficulty in assembly, and the reduction in assembly difficulty may improve the production efficiency; and from an operation and maintenance perspective, the reduction in the complexity of the whole machine may facilitate device maintenance, and more importantly, the reduction in the number of cables can effectively reduce the cost of a single server, with an estimated 2% reduction in the overall cost per server after optimization. In actual applications, since the production volume of servers is often tens of thousands, more costs may be saved.

The above system of transmitting a signal solves the problem of high signal transmission cost caused by the excessive number of cables connected to the hard disk backplane in the related art, thereby reducing the signal transmission cost.

In one exemplary embodiment, the server motherboard may be provided with the target processing unit, i.e., the processing unit for performing time-division multiplexing encoding/decoding. Similar to the above embodiment, the target processing unit may be configured to schedule and switch the VPP lighting signal and the SGPIO lighting signal in an orderly time-division way by using the preset time-division multiplexing manner according to the signal statuses and the signal characteristics of the VPP lighting signal and the SGPIO lighting signal in the signal transmission process, that is, the target processing unit schedules and switches the VPP lighting signal and the SGPIO lighting signal in an orderly time-division way by using the preset time-division multiplexing manner according to the signal statuses and the signal characteristics of the VPP lighting signal and the SGPIO lighting signal in the signal transmission process. The signal statuses of the VPP lighting signal and the SGPIO lighting signal in the signal transmission process may be the statuses of the VPP lighting signal and the SGPIO lighting signal in the signal transmission process (for example, whether a signal exists), and the signal characteristics of the VPP lighting signal and the SGPIO lighting signal in the signal transmission process may be specific signal values or specific signal changes of the VPP lighting signal and the SGPIO lighting signal in the signal transmission process.

The VPP lighting signal and the SGPIO lighting signal may include a plurality of control signals, which may include, but are not limited to, at least one of the following: a clock signal, a data signal, and a status signal. The VPP lighting signal includes a first clock signal, a first data signal, and an alert signal (the status signal in the VPP lighting signal). The first data signal may be configured to indicate the hard disk status of the NVMe hard disk corresponding to the VPP lighting signal, and the alert signal may be configured to indicate alert information. The SGPIO lighting signal includes a second clock signal, a second data signal, and a status signal. The second data signal may be configured to indicate the hard disk status of the SATA hard disk corresponding to the SGPIO lighting signal, and the status signal may be configured to indicate a starting status of the SGPIO lighting signal.

When time-division multiplexing is performed, the first data signal and the second data signal are both transmitted to the target processing unit through respective data links, processed by the target processing unit, and multiplexed into a mixed data channel of the time-division multiplexing channel. The first clock signal and the second clock signal are both transmitted to the target processing unit through respective clock links, processed by the target processing unit, and multiplexed into a mixed clock channel in the time-division multiplexing channel. The alert signal and the status signal are both transmitted to the target processing unit through respective status links, processed by the target processing unit, and multiplexed into a mixed status channel in the time-division multiplexing channel. The target processing unit transmits the processed data signal, clock signal, status signal or alert signal to the target logic device through the time-division multiplexing channel. Here, the time-division multiplexing channel may lead out one physical cable (e.g., the low-speed cable) for the target processing unit.

Through the present embodiment, the VPP lighting signal and the SGPIO lighting signal are transmitted by using the time-division multiplexing manner through the time-division multiplexing encoding and decoding unit, so that the purpose of transmitting the two lighting signals at the same time by using the same physical channel may be achieved.

In one exemplary embodiment, according to the inside processing status of the signal, the target processing unit (i.e., the time-division multiplexing encoding and decoding unit) may be divided into at least one of the following three layers: a physical layer, a channel layer, and a data layer, each of which implements different functions of time-division multiplexing encoding and decoding, and after integration and unification, a full stack of the time-division multiplexing encoding and decoding module is formed. Taking the division into three layers as an example, the order of the three layers may be: the first layer (a bottom layer) is the physical layer, the second layer (a middle layer) is the channel layer, and the third layer (a top layer) is the data layer.

For example, as shown in FIG. 3, the time-division multiplexing encoding and decoding unit may include: the physical layer, the channel layer, and the data layer. The physical layer may form a physical channel for transmitting the VPP bus signal and the SGPIO bus signal and perform a switching action. The channel layer may determine the timing of channel switching according to a channel switching condition and a channel switching mechanism (i.e., by detecting the flag bits in the VPP signal and the SGPIO signal and determining the timing of channel switching according to a specific rule). The data layer may calculate sampling rates of the VPP data and the SGPIO data. The above three layers may constitute the full stack of the time-division multiplexing encoding and decoding unit.

For the physical layer, the physical layer may be a physical channel path that implements different signal buses, for example, a physical channel path that implements the VPP bus and the SGPIO bus, which may be configured to form the time-division multiplexing channel and switch the VPP lighting signal and the SGPIO lighting signal which are transmitted in the time-division multiplexing channel. The physical layer of the target processing unit may be provided with a switching module, and the switching module is a software module configured to perform signal switching. It is to be noted that the physical layer only performs the switching action, and the switching condition and the switching mechanism of the channel are implemented by the channel layer.

Correspondingly, the switching module is configured to switch the VPP lighting signal and the SGPIO lighting signal by using the time-division multiplexing manner through the switching module of the physical layer of the target pro-
cessing unit, so as to be transmitted to the target logic device
through the time-division multiplexing channel.

At the physical layer, the switching module may switch
the VPP lighting signal and the SGPIO lighting signal by
using the time-division multiplexing manner, so as to trans-
mit the VPP lighting signal and the SGPIO lighting signal to
the target logic device in an orderly time-division way by
using the preset time-division multiplexing manner through
the time-division multiplexing channel.

Figure 4:
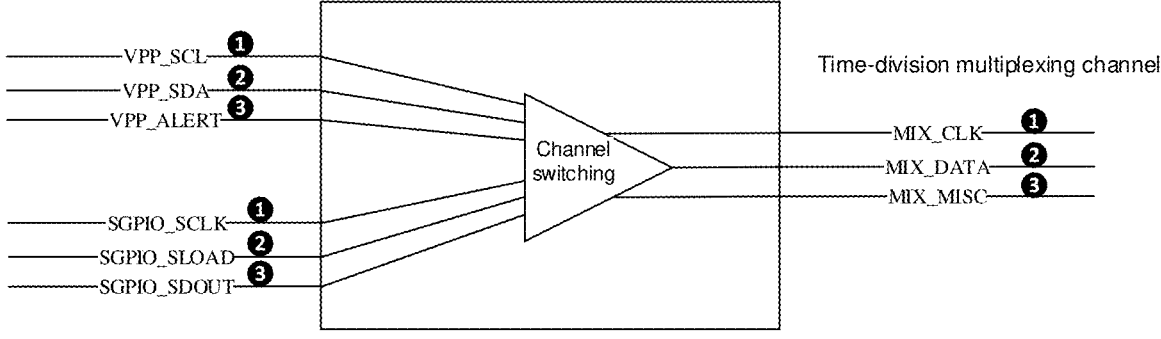
FIG. 4 is a schematic diagram of channel switching logic of a time-division multiplexing physical layer according to an embodiment of the present disclosure.

For example, the structure of the physical layer is shown
in FIG. 4. The basic structure of the physical layer is similar
to an analog switch. The VPP bus includes three signal lines:
a VPP_SCLK clock signal (i.e., the first clock signal),
VPP_SDA (i.e., the first data signal), and VPP_ALERT (i.e.,
the alert signal). The SGPIO bus includes three signal lines:
SGPIO_SCLK (i.e., the second clock signal), SGPIO_S-
LOAD (i.e., the status signal), and SGPIO_SDOUT (i.e., the
second data signal). The VPP and SGPIO bus signals are
both connected to one end of the physical layer as input. The
time-division multiplexing channel includes three signals:
MIX_CLK (i.e., the mixed clock channel), MIX_DATA
(i.e., the mixed data channel), and MIX_MISC (i.e., the
mixed status channel), which are located at the other end of
the physical layer as output. The physical layer may switch
the channel and transmit the VPP signal or the SGPIO signal
to the time-division multiplexing channel. The correspond-
ing relationship of each signal is in one-to-one correspon-
dence with digital serial numbers in FIG. 4.

Through the present embodiment, the VPP lighting signal
and the SGPIO lighting signal are switched through the
switching module in the physical layer of a time-division
multiplexing unit, so as to transmit the VPP lighting signal
and the SGPIO lighting signal to the logic device on the hard
disk backplane. The VPP lighting signal and the SGPIO
lighting signal may be transmitted in an orderly manner, so
as to achieve the purpose of transmitting the two lighting
signals at the same time through the same physical channel,
thereby improving the efficiency of signal transmission.

The channel layer of the target processing unit may be
configured to execute detection and switching mechanisms
of the VPP channel and the SGPIO channel. Correspond-
ingly, the channel layer of the processing unit is configured
to detect, identify and parse information contained in the
VPP lighting signal and the SGPIO lighting signal, and
switch the VPP lighting signal and the SGPIO lighting signal
by using the preset time-division multiplexing manner
through the channel layer so as to alternately use the
time-division multiplexing channel at respective time inter-
vals, where a set of respective signal code streams is
transmitted each time.

In the present embodiment, the channel layer of the target
processing unit may detect, identify and parse the informa-
tion contained in the VPP lighting signal and the SGPIO
lighting signal, and switch the VPP lighting signal and the
SGPIO lighting signal by using the preset time-division
multiplexing manner through the channel layer using the
preset rule so as to alternately use the time-division multi-
plexing channel in the respective time intervals, where a set
of respective signal code streams is transmitted each time.
The preset rule here may be a preset switching rule for the
VPP lighting signal and the SGPIO lighting signal, that is,
when a preset condition is met, the VPP lighting signal or the
SGPIO lighting signal is switched, so that the VPP lighting
signal and the SGPIO lighting signal alternately use the
time-division multiplexing channel in the respective time
intervals, and one set of corresponding signal code streams of the VPP lighting signal or the SGPIO lighting signal may
be transmitted at each switch.

Here, the information contained in the VPP lighting signal
and the SGPIO lighting signal may be information contained
in the clock signals, the data signals or the status signals (or
the alert signals) of the VPP lighting signal and the SGPIO
lighting signal. The detection, identification and parsing here
may be the detection, identification and parsing of specific
information contained in the VPP lighting signal and the
SGPIO lighting signal. For example, by detecting the infor-
mation contained in the VPP lighting signal and the SGPIO
lighting signal, the specific flag bits therein are identified,
and by parsing the specific flag bits, it is determined whether
to switch the VPP lighting signal and the SGPIO lighting
signal.

Through the present embodiment, the timing of switching
between the VPP lighting signal and the SGPIO lighting
signal is determined through the channel layer, and the VPP
lighting signal and the SGPIO lighting signal may be
alternately transmitted using the time-division multiplexing
channel in different time intervals, which may improve the
efficiency of signal transmission.

In one exemplary embodiment, in order to switch the VPP
lighting signal and the SGPIO lighting signal in the respec-
tive time intervals by using the preset time-division multi-
plexing manner and alternately use the time-division mul-
tiplexing channel, the channel layer is further configured to
execute the following steps.

At S1, the following first channel conduction operation is
performed first: the VPP lighting signal is conducted to the
time-division multiplexing channel through the switching
module of the physical layer, so as to send the VPP lighting
signal to the hard disk backplane, and the SGPIO lighting
signal is shielded during this period.

In the initial status, the VPP lighting signal may be
conducted to the time-division multiplexing channel first, so
as to be sent to the hard disk backplane. In order to ensure
that only the VPP lighting signal is transmitted in the
time-division multiplexing channel at the same time, the
SGPIO lighting signal is shielded during this period.

The channel layer may complete the detection and switch-
ing of the VPP lighting signal and the SGPIO lighting signal
through four steps. For the first step, in the initial status, the
VPP bus is conducted into the time-division multiplexing
signal band first, and the VPP signal is transmitted to the
hard disk backplane. When the VPP signal is transmitted, no
matter how the SGPIO signal changes, it may be ignored and
not processed. The signal currently transmitted in the chan-
nel is the VPP signal.

When the first channel conduction operation is performed,
it may be detected whether the VPP lighting signal has been
sent. The completion of the sending of the VPP lighting
signal may be determined based on the status of the code
stream of the first data signal of the VPP lighting signal.
Optionally, the above channel layer is further configured to:
   detect a signal level of the first data signal within each first
      clock cycle after the following first channel conduction
      operation is performed first, where the first clock cycle
      is a clock cycle of the first clock signal; and
   determine that the VPP lighting signal has been sent in a
      case of detecting the signal level of the first data signal
      within M consecutive first clock cycles to be a first
      preset level, where M is a positive integer greater than
      or equal to 1.

After the first channel conduction operation is performed,
the signal level of the first data signal within each first clock
cycle (i.e., the clock cycle of the first clock signal) may be detected. It may be determined that the VPP lighting signal has been sent in a case of detecting the signal level of the first data signal within the M consecutive first clock cycles to be the first preset level. Here, the first preset level may be a preset level status and may be a high level, and M is the positive integer greater than or equal to 1.

Through the present embodiment, by detecting the status of the VPP lighting signal to determine whether the VPP lighting signal has been sent, the accuracy of signal transmission may be improved.

At S2, after it is detected that the VPP lighting signal has been sent, a path from the VPP lighting signal to the time-division multiplexing channel is cut off, the code stream of the status signal in the SGPIO lighting signal is detected, and when the code stream is detected to be in a specific status, the following second channel conduction operation is performed: a control signal set conducted to the time-division multiplexing channel is switched to the SGPIO lighting signal through the switching module of the physical layer, so as to send the SGPIO lighting signal within one data cycle to the hard disk backplane;

After it is detected that the VPP lighting signal has been sent, the path from the VPP lighting signal to the time-division multiplexing channel may be cut off. The path from the VPP lighting signal to the time-division multiplexing channel may be cut off by stopping the conduction of the VPP lighting signal to the time-division multiplexing channel, and the path from the control signal set to the time-division multiplexing channel is cut off by stopping the conduction of the channel corresponding to the control signal to the time-division multiplexing channel, so that the reliability of cutting off the path from the control signal set to the time-division multiplexing channel may be improved.

After it is detected that the VPP lighting signal has been sent, the code stream of the status signal in the SGPIO lighting signal may also be detected. If the specific status of the code stream of the status signal in the SGPIO lighting signal is detected, the second channel conduction operation may be performed at this time to send the SGPIO lighting signal within one data cycle to the hard disk backplane: the control signal set conducted to the time-division multiplexing channel is switched to the SGPIO lighting signal through the switching module of the physical layer.

The specific status of the code stream of the status signal in the SGPIO lighting signal may be a status of a signal level of the status signal in the SGPIO lighting signal. Optionally, the above channel layer is further configured to:

detect, before the following second channel conduction operation is performed, the signal level of the status signal in the SGPIO lighting signal within each second clock cycle, where the second clock cycle is the clock cycle of the second clock signal; and determine the code stream of the status signal to be in the specific status in a case of detecting the signal level of the status signal within N consecutive second clock cycles to be a second preset level, where N is a positive integer greater than or equal to 1, and the status signal is configured to indicate a starting position of the second data signal within one data cycle.

Before the second channel conduction operation is performed, the signal level of the status signal in the SGPIO lighting signal within each clock cycle (i.e., the clock cycle of the second clock signal) may be detected, and it is determined whether to perform the second channel conduction operation according to the status signal. Here, the status signal may be configured to indicate the starting position of the second control signal within one data cycle, that is, to indicate the starting position of sending the SGPIO lighting signal within a sending cycle of the SGPIO lighting signal.

The code stream of the status signal may be determined to be in the specific status in a case of detecting the signal level of the status signal within the N consecutive second clock cycles to be the second preset level, the second preset level may be a preset level status, such as a low level, and N is the positive integer greater than or equal to 1.

Through the present embodiment, by detecting the status signal to determine whether to send the SGPIO lighting signal and the time to send the SGPIO lighting signal, the efficiency of signal transmission may be improved.

Here, it may be determined whether the SGPIO lighting signal within one data cycle has been sent by detecting the specific status of the code stream of the status signal in the SGPIO lighting signal. If the status signal in the SGPIO lighting signal is detected to be a specific code stream, it may be determined that the SGPIO lighting signal within one data cycle has been sent. What is transmitted after the SGPIO lighting signal is complete data within one data cycle. At this time, the path from the SGPIO lighting signal to the time-division multiplexing channel is switched, which may ensure the integrity of signal transmission and avoid data transmission errors caused by directly switching the SGPIO lighting signal.

Figure 5:
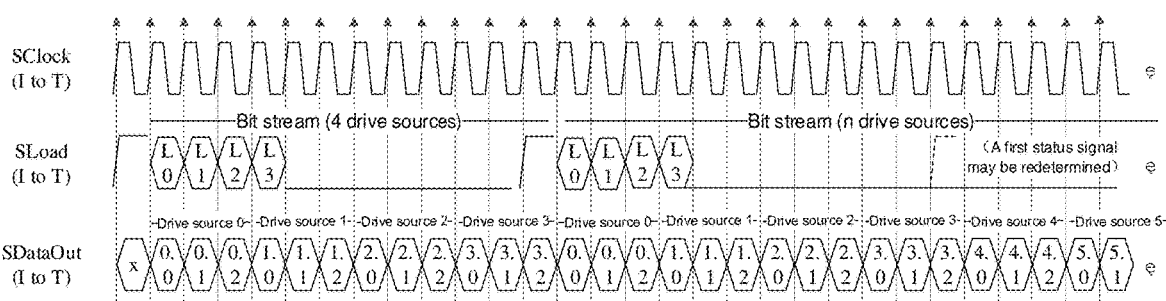
FIG. 5 is a schematic diagram of an SGPIO lighting signal according to an embodiment of the present disclosure.

For example, as shown in FIG. 5, the SGPIO signal continuously transmits the code stream containing the current statuses of all the SATA hard disks. A rising edge of SLOAD (status signal) represents the start of a new set of hard disk lighting information. At the next clock of the rising edge of SLOAD, Sdata (data line number) starts data transmission. Sdata transmits the lighting information of at least four hard disks.

For the second step, after it is detected that the VPP signal has been transmitted, the path from the VPP to the time-division multiplexing signal band is cut off. The method of detecting that the VPP signal has been transmitted may be as follows: a level change of a VPP waveform is detected, when there is no signal transmission, due to the presence of pull-up, the signal always remains at a high level without change. At the same time, the status of the SLOAD signal in the current SGPIO signal may be detected. If the status of the current SLOAD signal is 0, the operation is not performed temporarily. It may be seen from an SGPIO protocol that if the status of the SLOAD signal is 0, the current SLOAD status is either sending L0-L3, or waiting at a low level for SDOUT to be sent. In both cases, there is data on SDOUT being output by the SATA controller, and direct switching at this time may cause data errors.

In this regard, before the path from the VPP to the time-division multiplexing signal band is cut off, the status of the code stream of the SLOAD signal in the current SGPIO signal may be detected first. When SLOAD is continuously detected to be 0 within five consecutive cycles, it means that SLOAD has sent L0-L3 and is waiting for SDOUT to send the completion data. At this time, the SLOAD and SCLK signals are switched to the time-division multiplexing signal band. The purpose of switching SLOAD is to enable the module to send the rising edge of SLOAD to a destination hard disk backplane in advance before the next SGPIO waveform is sent.

Optionally, in order to ensure the complete sending of the SGPIO lighting signal, the SGPIO lighting signal within one data cycle starts to be transmitted within the next clock cycle of the second clock signal after the rising edge of the status signal, i.e., within one data cycle, after the rising edge of the status signal is detected, the SGPIO lighting signal starts to be transmitted within the next clock cycle. Since the server motherboard may resend the SGPIO lighting signal within the next clock cycle of the second clock cycle after the rising edge of the status signal is detected, the SGPIO lighting signal is transmitted to the hard disk backplane at this time, which may ensure that the SGPIO lighting signal is completely sent.

For example, when the rising edge of SLOAD is detected, the SDOUT signal is switched, that is, the SLOAD and SCLK signals are switched to the time-division multiplexing signal band, because SDOUT may send a set of lighting information from the beginning within the next clock cycle of the rising edge of SLOAD. At this time, SLOAD is switched in advance to ensure the integrity of the next set of lighting information data and avoid data loss. As shown in FIG. 5, in FIG. 5, a drive source (drive) includes three bits corresponding to the lighting signal of the hard disk, and the first status information may be reset, which means First time SLOAD may be reasserted. The signal currently transmitted in the channel is the SGPIO signal.

At S3, after it is determined that the SGPIO lighting signal within the current data cycle has been sent by detecting the status signal in SGPIO lighting signal to be the specific code stream, a path from the SGPIO lighting signal to the time-division multiplexing channel is cut off. The time-division multiplexing channel is in a disabled status, and no signal is currently transmitted in the time-division multiplexing channel.

If the status signal in the SGPIO lighting signal is detected to be the specific code stream, it may be determined that the SGPIO lighting signal within the current data cycle has been sent. At this time, it is necessary to determine whether the control signal set needs to be switched. For this, the path from the SGPIO lighting signal to the time-division multiplexing channel may be cut off first, and the time-division multiplexing channel may be in the disabled status. In the disabled status, no signal is transmitted in the time-division multiplexing channel.

For example, in the second step, the SGPIO has completed the switching of the time-division multiplexing channel and transmits the SGPIO data normally. For the third step, after the data transmission of one cycle is completed and the next SGPIO code stream is prepared for transmission, the SLOAD signal may generate the rising edge. After the rising edge is detected, all the signals from the SGPIO bus to the time-division multiplexing signal band are cut off. In this way, only one set of SGPIO signals is transmitted within a whole channel switching cycle. No signal is currently transmitted in the channel, which is in the disabled status and waiting for detection.

At S4, signal detection is performed on the first clock signal within a preset time, and it is determined whether to perform the first channel conduction operation or the second channel conduction operation based on a signal detection result of the first clock signal.

After the path from the SGPIO lighting signal to the time-division multiplexing channel is cut off, the first clock signal may be detected within the preset time, and it may be determined whether the VPP lighting signal or the SGPIO lighting signal is transmitted later based on the signal detection result of the first clock signal, thereby determining whether to perform the aforementioned first channel conduction operation or the second channel conduction operation. Here, the preset time may be a preset waiting time, for example, 100 ms, or other time, which is not limited in the present embodiment.

Optionally, the channel layer is further configured to determine whether to perform the first channel conduction operation or the second channel conduction operation based on the signal detection result of the first clock signal through the following steps.

In a case where the signal detection result of the first clock signal is configured to indicate that the first clock signal changes within the preset time, it is determined to perform the first channel conduction operation.

In a case where the signal detection result of the first clock signal is configured to indicate that the first clock signal does not change within the preset time, it is determined to perform the second channel conduction operation.

In the present embodiment, if the signal detection result of the first clock signal is configured to indicate that the first clock signal changes within the preset time, the change may be due to a change in the hard disk status of the first type of hard disk, and the first channel conduction operation may be performed to transmit the VPP lighting signal, so as to update the status of the status indicator lamp corresponding to the first type of hard disk. If the signal detection result of the first data signal is configured to indicate that the first data signal does not change within the preset time, it may be determined that the hard disk status of the first type of hard disk does not change, and it may be determined to perform the second channel conduction operation to transmit the SGPIO lighting signal.

For example, for the fourth step, after the SGPIO is cut off, a 100 ms timing wait is started. The VPP signal waveform is continuously detected within 100 ms, and the VPP or SGPIO signal currently transmitted in the channel is determined based on the detection result: if a signal change in VPP CLK is detected during this period, the first step is jumped to execute, the channel is switched to the VPP and the transmission of the next set of VPP signals is performed; and if there is no signal in the VPP during this period, the second step is jumped to switch the channel SGPIO according to the rule of the second step, and the next set of SGPIO data is transmitted.

According to the aforementioned S1 to S4 and so on, the VPP lighting signal and the SGPIO lighting signal may be alternately transmitted to the time-division multiplexing channel.

Through the present embodiment, the VPP lighting signal and the SGPIO lighting signal are alternately transmitted by using the time-division multiplexing manner through the same physical cable, which may achieve efficient signal transmission and improve the efficiency of signal transmission.

For the channel layer, the method of transmitting a signal in the present embodiment is explained below in conjunction with an optional example. In the present optional example, the first data signal is the data signal in the VPP lighting signal, the first clock signal is the clock signal (VPP_CLK) in the VPP lighting signal, the second control signal is the data signal (SDOUT) in the SGPIO lighting signal, the second clock signal is the clock signal in the SGPIO lighting signal, and the status signal is the status signal (SLOAD) in the SGPIO lighting signal.

Figure 6:
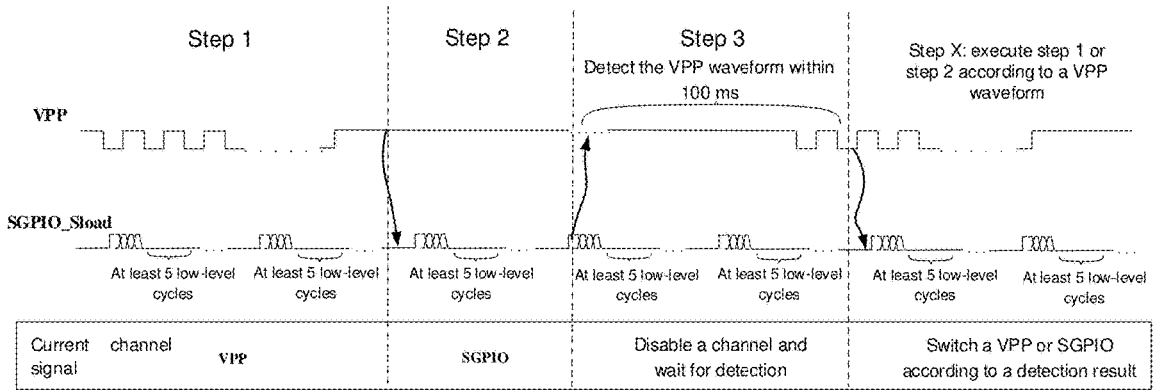
FIG. 6 is a schematic diagram of signal transmission logic of a time-division multiplexing signal layer according to an embodiment of the present disclosure.

The present optional example provides a solution for displaying a plurality of types of hard disk status signals based on single-channel time-division multiplexing. The detection and switching mechanisms of the VPP channel and the SGPIO channel are executed by the channel layer, and the VPP signal and the SGPIO signal are alternately transmitted in the time-division multiplexing channel, which may reduce the number of cables connected to the hard disk backplane. As shown in FIG. 6, the flow of the method of transmitting a signal in the present optional example may include the following steps.

At S1, in the initial status, the VPP bus is conducted to the time-division multiplexing channel first, and the VPP signal is transmitted to the hard disk backplane. In the VPP signal transmission process, no matter how the SGPIO signal changes, it is ignored and not processed, and the signal transmitted in the time-division multiplexing channel is only the VPP signal.

At S2, the change of the VPP signal is detected, in the absence of signal transmission, due to the presence of a pull-up resistor (the pull-up resistor may provide a part of a driving current to a load to help a driver drive a high level), the VPP signal may always remain at a high level, and if the VPP signal is detected to be at a high level within the plurality of clock cycles, it is determined that the VPP signal has been sent.

In a case of detecting that the VPP signal has been sent, the status of the SLOAD signal in the current SGPIO signal is detected, and if the status of the current SLOAD signal is 0, the operation is not performed temporarily.

When SLOAD is continuously detected to be 0 within five consecutive cycles, the SLOAD signal and the SCLK signal are switched to the time-division multiplexing channel. At this time, SLOAD has sent L0-L3, and SDOUT is sending data. SLOAD is switched to the time-division multiplexing signal band, which may ensure that the rising edge of SLOAD may be sent to the hard disk backplane in advance before the next SGPIO waveform is sent. When the rising edge of SLOAD is detected, the SDOUT signal is switched to the time-division multiplexing channel. In the above process, only the SGPIO signal is transmitted in the time-division multiplexing channel.

At S3, after the SGPIO signal is switched to the time-division multiplexing channel, the SGPIO data may be transmitted normally. After the data transmission within one cycle is completed, the next SGPIO code stream may be transmitted. At this time, the SLOAD signal may generate one rising edge. In a case of detecting the rising edge, all the signals from the SGPIO bus to the time-division multiplexing signal band may be cut off, so that only one set of SGPIO signals is transmitted within a whole channel switching cycle. In the SGPIO signal transmission process, no other signal is transmitted in the channel, which is in the disabled status and waiting for the completion of SGPIO signal transmission.

At SX, after the SGPIO signal is cut off, a 100 ms timing wait is started, the VPP or SGPIO signal is transmitted in the time-division multiplexing channel according to the detection result, and the waveform of the VPP signal is continuously detected within 100 ms. If the signal change of VPP_CLK is detected within 100 ms, S1 is jumped to execute, the VPP channel is switched to the time-division multiplexing channel and the transmission of the next set of VPP signals is performed. If there is no signal in VPP within 100 ms, S2 is jumped, the SGPIO channel is switched according to the rule of S2, and the next set of SGPIO data is transmitted.

Through the present optional example, by detecting the flag bits of the VPP signal and the SGPIO signal and switching same according to the specific rule, the VPP signal and the SGPIO signal alternately use the same physical channel at the respective time intervals, and a set of respective signal code streams is transmitted each time, thereby achieving the function of time-division multiplexing and reducing the cables to the greatest extent.

For the data layer, the data layer may be configured to calculate and set the sampling rates of the data in the VPP lighting signal and the SGPIO lighting signal, and a calculation method of the sampling rates of the data of the VPP lighting signal and the SGPIO lighting signal may be set according to the respective code stream characteristics of the VPP lighting signal and the SGPIO lighting signal. Optionally, in order to schedule and switch the VPP lighting signal and the SGPIO lighting signal in an orderly time-division way by using the preset time-division multiplexing manner, the above data layer is configured to:

adapt a switching cycle and a switching frequency of the time-division multiplexing channel according to the code stream characteristics of the VPP lighting signal and the SGPIO lighting signal, so as to meet the requirements for sampling rates of original data of the VPP lighting signal and the SGPIO lighting signal; and perform, by the data layer of the target processing unit under the setting of the current preset time, data sampling on the VPP lighting signal and the SGPIO lighting signal switched by using the time-division multiplexing manner at a sampling rate of 10 times/ second (s), and transmit the obtained sampled data to the target logic device through the time-division multiplexing channel.

At the data layer, in the entire time-division multiplexing mechanism, the preset time is used as the detection cycle to prepare for a time-division multiplexing channel switch. Under the setting of the current preset time, the data layer may perform data sampling on the VPP lighting signal and the SGPIO lighting signal switched by using the time-division multiplexing manner at the sampling rate of a preset number of times per second, and transmit the obtained sampled data to the target logic device through the time-division multiplexing channel. The preset number of times here may be 10 times, or other times that meet the requirements of the VPP lighting signal and the SGPIO lighting signal.

Optionally, the switching cycle and the switching frequency of the time-division multiplexing channel may be adapted according to the code stream characteristics of the VPP lighting signal and the SGPIO lighting signal. The adaptation is to meet the requirements for the sampling rates of the original data of the VPP lighting signal and the SGPIO lighting signal. A result of the adaptation may be setting the above current preset time, such as 100 ms.

For example, according to the SGPIO specification of SFF-8485, each SGPIO code stream needs to contain information packets of at least four hard disk drivers, and each information packet may contain 3 bits, so that each set of SGPIO code streams needs at least 12 bits of data. According to the specification definition, the frequency distribution of the SGPIO clock signal is within the range of 32 Kilo-Hertz (kHz) to 100 kHz. Taking the highest 100 kHz as an example, 83333 sets of SGPIO data may be transmitted within 1 s. Each set of data occupies 12 microsecond (us). Therefore, the sampling data is large enough to meet the sampling requirements of time-division multiplexing.

According to the specification for hard disk lighting display, the maximum frequency of the display of the change of the current hard disk status is only 4 Hertz (Hz). Since up to 83333 sets of SGPIO data may be transmitted within 1 s on the waveform, and the final display on the lighting only needs to be greater than 4 Hz, the SGPIO is extracted, sampled and transmitted in different time periods within 1 s. As long as more than four sets of SGPIO data are transmitted within 1 s, the normal status may be displayed on the lighting. Even if all 83333 sets of data are sampled, so much information may not be displayed on the LED.

For the VPP, the commonly used clock frequency is 100 kHz. The information corresponding to each VPP address occupies a total of 16 bits. Each set of VPP data contains information of up to 16 drivers. Therefore, each set of VPP data contains up to 16*16=256 bits of information. At a frequency of 100 kHz, there are up to 3906 sets of VPP data code streams within 1 s. The transmission time of each set of VPP streams is 250 us. For the same reason as the SGPIO, the specification for VPP lighting display also follows SFF-8489 (Specification for SGPIO), and the lighting also requires only a maximum of 4 Hz.

Moreover, for the status switching, since the lighting is configured to observe the hard disk status, when the hard disk status changes, the delay of the change of the lighting display may not affect the observation. For the SGPIO lighting function, it is enough to use and may not affect the lighting function.

Figure 7:
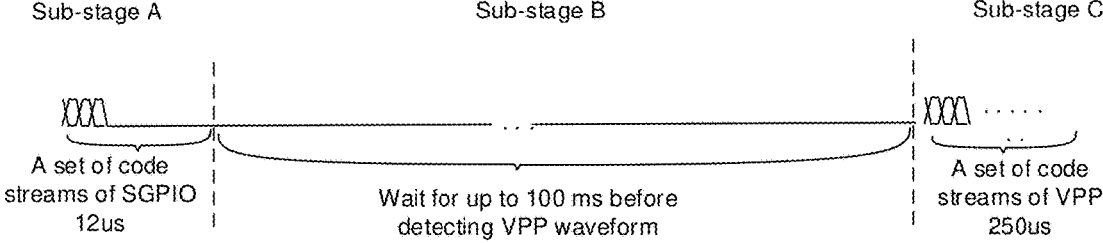
FIG. 7 is a schematic diagram of signal sampling of a time-division multiplexing data layer according to an embodiment of the present disclosure.

Therefore, in the entire time-division multiplexing manner, 100 ms may be used as the detection cycle to prepare for a time-division multiplexing channel switch. Referring to FIG. 7, a set of VPP code streams takes 0.25 ms, and a set of SGPIO code streams takes 12 us, which is almost negligible compared to 100 ms. Therefore, the VPP code stream may be sent ten times and the SGPIO code stream may be sent ten times within 1 s, and the sampling rate meets the lighting requirements.

The above sampling rate setting and calculation, for example, may be interpreted as follows: the frequency at which the information code stream is updated needs to be greater than the frequency required by the status indicator lamp of the hard disk. For example, assuming the sampling rate is 0.2 times/s, the SGPIO code stream is sampled once every 5 s, then the status of the hard disk indicator lamp within 5 s is inaccurate, because even if the hard disk status changes, it cannot be updated to the hard disk indicator lamp timely, and the update to the indicator lamp only occurs after 5 s.

The current sampling rate is set to 10 times/s, and after the current hard disk status changes, it may be transmitted to the hard disk indicator lamp after 0.1 s. A blinking frequency of the hard disk indicator lamp is only 4 HZ, that is, the hard disk indicator lamp blinks once every 0.25 s. A frequency at which the sampling rate is refreshed to the hard disk indicator lamp is much higher than a blinking frequency required by the specification for hard disk lighting, so that the indication of the hard disk status cannot be affected at all.

After time-division multiplexing encoding and decoding, 10 sets of VPP signals and 10 sets of SGPIO signals may be sent within 1 s, which is equivalent to the opposite hard disk backplane receiving the VPP and SGPIO signals 10 times within 1 s, fully meeting the function of indicating the hard disk lighting status. For the host and the hard disk backplane, the sampling rate of 10 times/s may be considered that the VPP and the SGPIO are sent and transmitted at the same time, and the time-division multiplexing switching mechanism and channel sharing cannot be perceived.

Through the present embodiment, the switching cycle and the switching frequency of the time-division multiplexing channel are adapted within the preset time according to the code stream characteristics of the VPP lighting signal and the SGPIO lighting signal, and data sampling is performed through the channel layer, so as to meet the requirements for the sampling rates of the original data of the VPP lighting signal and the SGPIO lighting signal, so that the target logic device on the target backplane may parse the VPP signal and the SGPIO signal at the same time through the time-division multiplexing channel without causing data omissions.

In one exemplary embodiment, each of the VPP lighting signal and the SGPIO lighting signal contains indication information of hard disk status, and an activity bit corresponding to an active status of the corresponding hard disk, a fault bit corresponding to fault reporting of the corresponding hard disk, and a location bit corresponding to a location status of the corresponding hard disk are obtained by parsing the indication information of hard disk status. For example, the lighting information of each hard disk may contain 3 bits, namely, Odn.0, Odn.1, and Odn.2, which respectively represent the status of the current hard disk.

Different combinations of the activity bit, the fault bit, and the location bit identify different hard disk statuses. When a combination of bit values on the activity bit, the fault bit, and the location bit is a first value, the indication information of hard disk status is configured to indicate that the corresponding hard disk is in the active status. When the combination of the bit values on the activity bit, the fault bit, and the location bit is a second value, the indication information of hard disk status is configured to indicate that the corresponding hard disk is not in the active status. When the combination of the bit values on the activity bit, the fault bit, and the location bit is a third value, the indication information of hard disk status is configured to indicate that the corresponding hard disk is not in any of a hard disk fault status, a hard disk location status, and a hard disk rebuild status. When the combination of the bit values on the activity bit, the fault bit, and the location bit is a fourth value, the indication information of hard disk status is configured to indicate that the corresponding hard disk is in the hard disk fault status. When the combination of the bit values on the activity bit, the fault bit, and the location bit is a fifth value, the indication information of hard disk status is configured to indicate that the corresponding hard disk is in the hard disk location status. When the combination of the bit values on the activity bit, the fault bit, and the location bit is a sixth value, the indication information of hard disk status is configured to indicate that the corresponding hard disk is in the hard disk rebuild status.

Here, the first value to the sixth value may be a fixed value or a combination of a plurality of values, that is, the combination of the bit values on the activity bit, the fault bit, and the location bit indicating the same hard disk status of the hard disk may be one or more, which is not limited in the present embodiment.

For example, the corresponding relationship between different combinations of Odn.0, Odn.1, and Odn.2 and the represented statuses is shown in Table 1.

TABLE 1

| Odn.0 Activity | Odn.1 Locate | Odn.2 Fail | Status represented |
|---|---|---|---|
| 1 | X | X | Activity |
| 0 | X | X | No Activity |
| X | 0 | 0 | No Fail, Locate or Rebuild |
| X | 1 | 0 | Locate |
| X | 0 | 1 | Fail |
| X | 1 | 1 | Rebuild |

As may be seen from Table 1, when the combination of Odn.0, Odn.1, and Odn.2 is 1XX (X indicates any value), it indicates that the hard disk is in the active status (Activity). When the combination of Odn.0, Odn.1, and Odn.2 is 0XX, it indicates that the hard disk is not in the active status (No Activity). When the combination of Odn.0, Odn. 1, and Odn.2 is X00, it indicates that the hard disk is not in any of the hard disk fault status, the hard disk location status, and the hard disk rebuild status (that is, No Fail, Locate or Rebuild). When the combination of Odn.0, Odn.1, and Odn.2 is X01, it indicates that the hard disk is in the hard disk fault status. When the combination of Odn.0, Odn.1, and Odn.2 is X10, it indicates that the hard disk is in the hard disk location status. When the combination of Odn.0, Odn. 1, and Odn.2 is X11, it indicates that the hard disk is in the hard disk rebuild status.

Through the present embodiment, different statuses of the hard disk are indicated according to different combinations of the activity bit, the fault bit, and the location bit, which may improve the flexibility and accuracy of determining the hard disk status, thereby improving the reliability of lighting.

In one exemplary embodiment, for the lighting signal transmitted by the server motherboard by using the preset time-division multiplexing manner, the target logic device is further configured to:

receive a target lighting signal, where the target lighting signal is any one of the VPP lighting signal and the SGPIO lighting signal, and the target lighting signal is a lighting signal of a target status indicator lamp corresponding to a target hard disk inserted into a target hard disk slot in the set of hard disk slots;

extract indication information of target status corresponding to the target hard disk from the target lighting signal, where the indication information of target status is configured to indicate a hard disk status of the target hard disk; and control a display status of the target status indicator lamp according to the hard disk status indicated by the indication information of target status in combination with an inserted status of the target hard disk.

At a target logic device side, the target lighting signal sent by the server motherboard may be received. The target lighting signal may be any one of the VPP lighting signal and the SGPIO lighting signal. Correspondingly, the target lighting signal is the lighting signal of the target status indicator lamp corresponding to the target hard disk inserted into the target hard disk slot in the set of hard disk slots. Here, the target hard disk is the NVMe hard disk or the SATA hard disk, and the target hard disk slot is a slot into which the target hard disk is inserted.

In response to the received target lighting signal, the target logic device may extract the indication information of target status corresponding to the target hard disk from the target lighting signal. The indication information of target status is configured to indicate the hard disk status of the target hard disk, and control the display status of the target status indicator lamp according to the hard disk status indicated by the indication information of target status in combination with the inserted status of the target hard disk.

For example, after the current hard disk status is parsed, the logic device on the hard disk backplane may light the corresponding LED in a lighting form defined by the SFF-8489 specification.

In the present embodiment, the hard disk status and the inserted status may be obtained based on SFF-8489 International Blinking Pattern Interpretation (IBPI) status decoding, and the inserted status of the hard disk may be sent to the hard disk backplane through an individual hardware signal. Optionally, the target logic device is further configured to:

receive, before the display status of the target status indicator lamp is controlled according to the hard disk status indicated by the indication information of target status in combination with the inserted status of the target hard disk, a status indication signal corresponding to the target hard disk through a physical cable different from the lighting cable that transmits the VPP lighting signal and the SGPIO lighting signal, where the status indication signal is configured to indicate the inserted status of the target hard disk; and determine, in response to the received status indication signal, the inserted status indicated by inserted status indication information in the status indication signal to be the inserted status of the target hard disk.

In the present embodiment, the status indication signal configured to indicate the inserted status of the target hard disk may be transmitted through the physical cable different from the physical cable that transmits the VPP lighting signal and the SGPIO lighting signal, that is, the physical cable that transmits the status indication signal may be a physical cable different from the time-division multiplexing channel.

After the status indication signal is received, the target logic device may determine the inserted status of the target hard disk according to the inserted status indicated by the inserted status indication information in the status indication signal, that is, determine whether the target hard disk is inserted or not inserted, and determine the hard disk status of the target hard disk based on the inserted status of the target hard disk. Here, the inserted status of the hard disk is transmitted through the physical cable different from the time-division multiplexing channel, which may improve the reliability and timeliness of the inserted status transmission.

Through the present embodiment, by receiving the target lighting signal of the hard disk, extracting the status indication information of the corresponding hard disk therefrom, and performing lighting on the corresponding indicator lamp based on the hard disk status indicated by the status indication information in combination with the inserted status of the hard disk, the accuracy of lighting may be improved.

In one exemplary embodiment, a certain hard disk may contain two corresponding indicator lamps, one of which corresponds to the inserted status and the active status of the hard disk (e.g., Activity LED), and the other corresponds to a fault reporting status, the location status, and the rebuild status (namely, a hard disk fault status, a hard disk location status, and a hard disk rebuild status) of the target hard disk (e.g., Status LED). The target status indicator lamp may contain: a first indicator lamp corresponding to the inserted status and the active status of the target hard disk, and a second indicator lamp corresponding to the fault reporting status, the location status, and the rebuild status (namely, the hard disk fault status, the hard disk location status, and the hard disk rebuild status) of the target hard disk.

Correspondingly, the target logic device is further configured to:

control the first indicator lamp to be in an off status in a case where the target hard disk is not inserted;

control the first indicator lamp to be in an on status in a case where the target hard disk is inserted and not in the active status;

control the first indicator lamp to be in a blinking status of blinking at a first frequency in a case where the target hard disk is inserted and the active status;

control the first indicator lamp to be in the blinking status of blinking at the first frequency in a case where the target hard disk is in the hard disk location status, and control the second indicator lamp to be in the blinking status of blinking at the first frequency;

control the second indicator lamp to be in an on status in a case where the target hard disk is in the hard disk fault status; and control the second indicator lamp to be in a blinking status of blinking at a second frequency in a case where the target hard disk is in the hard disk rebuild status.

Based on the on/off of the first indicator lamp and the second indicator lamp, blinking at different frequencies or other display modes, different statuses of the hard disk may be indicated. According to the specification SFF-8489 for the hard disk lighting display, the lamp may have a plurality of statuses according to different hard disk statuses, that is, loc 4 Hz blinking, fail: on always on, and rebuilt 1 Hz blinking. The corresponding relationship between the hard disk status and the indicator lamp is shown in Table 2.

TABLE 2

| SFF-8489 IBPI status decoding | 2 LED | |
| --- | --- | --- |
| | Activity LED | Status LED |
| Hard disk is not inserted | OFF | X |
| Hard disk is inserted and inactive | ON | X |
| Hard disk is inserted and active | 4 Hz | X |
| Hard disk location | 4 Hz | 4 Hz |
| Hard disk fault | X | ON |
| Hard disk rebuild | X | 1 Hz |

As may be seen from Table 2, when the hard disk is not inserted (namely, the inserted status indicates that the target hard disk is not inserted), the Activity LED is off and the Status LED is in any status. When the hard disk is inserted (namely, the inserted status indicates that the target hard disk is inserted), and an inactive status, the Activity LED is on and the Status LED is in any status. When the hard disk is the inserted (namely, the inserted status indicates that the target hard disk is inserted), and the active status, the Activity LED blinks at 4 Hz and the Status LED is in any status. When the hard disk is in the hard disk location status, both the Activity LED and the Status LED blink at 4 Hz. When the hard disk is in the hard disk fault status, the Activity LED is in any status and the Status LED is on. When the hard disk is in the hard disk rebuild status, the Activity LED is in any status and the Status LED blinks at 1 Hz.

Through the present embodiment, different hard disk statuses are indicated by different combinations of the two indicator lamps, which may improve the flexibility of hard disk status display and improve the reliability of lighting.

In one exemplary embodiment, the server motherboard includes: a central controller (i.e., the aforementioned first controller), and the VPP lighting signal may be generated by the central controller. Correspondingly, the central controller is configured to:

detect the hard disk status of each NVMe hard disk in the set of NVMe hard disks inserted in the set of hard disk slots; and generate, in a case where a target NVMe hard disk whose hard disk status is updated exists in the set of NVMe hard disks, the VPP lighting signal according to the hard disk status of the target NVMe hard disk.

When the central controller of the server motherboard detects that the set of NVMe hard disks (which may contain one or more NVMe hard disks) are inserted into the set of hard disk slots, the hard disk status of each NVMe hard disk may be detected. If the NVMe hard disk whose hard disk status is updated is detected, i.e., the target NVMe hard disk, the VPP lighting signal configured to indicate the updated hard disk status of the target NVMe hard disk may be generated according to the hard disk status of the target NVMe hard disk.

Optionally, the method of generating the VPP lighting signal according to the hard disk status of the target NVMe hard disk may be as follows: in a case where the target NVMe hard disk whose hard disk status is updated exists in the set of NVMe hard disks, the VPP lighting signal is generated according to the hard disk status of the target NVMe hard disk. The VPP lighting signal carries target address information of the target NVMe hard disk and target lighting information of the status indicator lamp corresponding to the target NVMe hard disk, and each of a plurality of first bits in the target lighting information corresponds to a hard disk status parameter.

Here, the central controller may generate the VPP lighting signal according to the hard disk status of the target NVMe hard disk, and the VPP lighting signal is configured to indicate the updated hard disk status of the target NVMe hard disk. The VPP lighting signal may carry the target address information of the target NVMe hard disk (the address information of the NVMe hard disk on the hard disk backplane, i.e., the address information of the hard disk slot corresponding to the target NVMe hard disk on the hard disk backplane), and the target lighting information of the status indicator lamp corresponding to the target NVMe hard disk. The target lighting information may contain a plurality of first bits, each of which may correspond to one hard disk status parameter, that is, each first bit indicates one hard disk status parameter. In combination with the hard disk status parameter corresponding to each first bit in the target lighting information, the hard disk status of the target NVMe hard disk may be determined. In this way, the accuracy of signal transmission may be improved.

Optionally, in order to generate the VPP lighting signal, the central controller is further configured to generate a first sub-VPP lighting signal carrying the target address information according to address information of the target NVMe hard disk, and generate a second sub-VPP lighting signal carrying the target lighting information according to the hard disk status of the target NVMe hard disk. The first sub-VPP lighting signal includes fixed bits and hard disk address bits, the fixed bits contain a first number of bits, and the hard disk address bits contain a second number of bits.

The VPP lighting signal may include the first sub-VPP lighting signal and the second sub-VPP lighting signal. The first sub-VPP lighting signal carries the target address information, and the second sub-VPP lighting signal carries the target lighting information. The first sub-VPP lighting signal may be generated according to the address information of the target NVMe hard disk, and the second sub-VPP lighting signal may be generated according to the hard disk status of the target NVMe hard disk. The first sub-VPP lighting signal may include the fixed bits and the hard disk address bits, the fixed bits may include the first number of bits, the bit values of the fixed bits may be preset fixed values, and the hard disk address bits may include the second number of bits, which may be configured to indicate the address information of the target NVMe hard disk.

Through the above method, the address information of the VPP lighting signal is generated according to the address information of the NVMe hard disk, and the status information of the VPP lighting signal is generated according to the status information of the NVMe hard disk, so as to obtain the VPP lighting signal, which may improve the reliability of lighting.

For example, for the NVMe hard disk, the VPP bus transmits the lighting code stream in the form of SMBUS, and the format is the standard form of Inter-Integrated Circuit (I2C) (two-wire serial bus) addressing access. As shown in FIG. 8, the host sends information in I2C format, first sending 8-bit address information (including read and write bits) to identify whether the hard disk is the current hard disk through the logic of the hard disk backplane. Then, the 8-bit lighting code stream is sent, and the fault, locate and act bits therein are identified through the logic of the hard disk backplane. The hard disk backplane parses the status of the current hard disk according to the definition in the SFF-8489 specification, and controls the LED to blink, and the hard disk status is expressed through the blinking frequency of the LED.

For VPP lighting, the host may send the VPP signal only when the hard disk status changes or there is an operation. If the hard disk status is not updated, the host may idle the VPP bus. Due to the unique VPP lighting mechanism, for the lighting logic on the hard disk backplane, after the CPLD receives the signal, the VPP information may be parsed and the hard disk may be lighted. Since the host sends the VPP irregularly and unpredictably, and cannot send the VPP signal all the time, the lighting logic may maintain the current parsing status and continue to light the hard disk. Until the next time the host sends the VPP information and refreshes the current hard disk status, the logic may update the hard disk lighting to the latest status.

Through the present embodiment, by detecting the hard disk status of each NVMe hard disk and generating the lighting signal of the status indicator lamp corresponding to the NVMe hard disk only when the hard disk status of the NVMe hard disk changes, the amount of lighting information required to be transmitted may be reduced, and the rationality of data transmission resource utilization may be improved.

In one exemplary embodiment, the server motherboard further includes an SATA controller (i.e., the aforementioned second controller), and the SGPIO lighting signal may be generated by the SATA controller. Correspondingly, the SATA controller is configured to:

detect the hard disk status of each SATA hard disk in a set of SATA hard disks inserted in the set of hard disk slots; and generate the SGPIO lighting signal according to the hard disk status of each SATA hard disk.

The SATA controller may detect whether the SATA hard disk is inserted into the set of hard disk slots formed in the hard disk backplane, and in a case where the SATA hard disk is inserted into the set of hard disk slots, the SATA controller on the server motherboard may detect the hard disk status of each SATA hard disk inserted in the set of hard disk slots, and generate the SGPIO lighting signal configured to sequentially indicate the status of each SATA hard disk according to the hard disk status of a target SATA hard disk. Here, the SGPIO lighting signal is a lighting signal of the status indicator lamp corresponding to each SATA hard disk, and is configured to sequentially indicate the hard disk status of each SATA hard disk.

Optionally, the SATA controller is further configured to continuously poll and send data code streams. Each set of data code streams sent by the SATA controller contains lighting information of the status indicator lamp corresponding to each SATA hard disk.

In the present embodiment, the SATA controller may continuously poll and send the data code streams, that is, the SATA controller sends the set of data code streams corresponding to each SATA hard disk. Here, each set of data code streams sent by the SATA controller contains the lighting information of the status indicator lamp corresponding to each SATA hard disk. Through the above method, the continuous transmission of the SGPIO lighting signal may be realized, and the reliability of signal transmission is improved.

For example, for the SGPIO, the host may continue to poll and send the data code streams. All the hard disk lighting information is saved in each set of data code streams, and is continuously and repeatedly polled and sent. There is no waiting period or sleep time between each set of code streams. The lighting logic mapped to the hard disk backplane may detect the rising edge of SLOAD. When the rising edge is detected, the SGPIO information is parsed and the hard disk is lighted. The lighting logic on the hard disk backplane may not save the parsed lighting status, and may parse and light immediately. If the host does not send the next set of lighting information, the lighting logic may not send any lighting information to the LED within the next time period.

Through the present embodiment, by detecting the hard disk status of each SATA hard disk and generating the lighting signal of the status indicator lamp corresponding to the SATA hard disk, the accuracy of lighting may be improved.

It is to be noted herein that the above modules are the same as the examples and application scenarios implemented by the corresponding steps, but are not limited to the contents disclosed in the above embodiment. It is to be noted that the above modules, as a part of the apparatus, may run in a hardware environment shown in FIG. 1, and may be implemented by software or hardware. The hardware environment includes a network environment.

According to another aspect of the embodiments of the present disclosure, a method of transmitting a signal applied to the above system of transmitting a signal is further provided. The system architecture of the system of transmitting a signal is similar to that in the above embodiments, which will not be elaborated herein. Optionally, as shown in FIG. 9, FIG. 9 is a schematic flowchart of a method of transmitting a signal according to an embodiment of the present disclosure. As shown in FIG. 9, the flow includes the following steps.

At S902, acquiring a Virtual Pin Port (VPP) lighting signal and a Serial General Purpose Input/Output (SGPIO) lighting signal to be transmitted to a target logic device on a hard disk backplane, wherein the target logic device is a logic device configured to control a hard disk inserted into a hard disk slot in a set of hard disk slots on the hard disk backplane, the VPP lighting signal is a lighting signal corresponding to a Non Volatile Memory express (NVMe) hard disk inserted into a hard disk slot in the set of hard disk slots, and the SGPIO lighting signal is a lighting signal corresponding to a Serial Advanced Technology Attachment (SATA) hard disk inserted into a hard disk slot in the set of hard disk slots.

At S904, scheduling and switching the VPP lighting signal and the SGPIO lighting signal in an orderly time-division way by using a preset time-division multiplexing manner, so as to transmit the VPP lighting signal and the SGPIO lighting signal to the target logic device through a same lighting cable, wherein the preset time-division multiplexing manner comprises: continuously detecting the VPP lighting signal and the SGPIO lighting signal within a time-division multiplexing cycle, performing identification and determination according to waveform characteristics of the VPP lighting signal and the SGPIO lighting signal, sampling the VPP lighting signal and the SGPIO lighting signal which are continuously sent, and switching the VPP lighting signal and the SGPIO lighting signal to be alternately transmitted to a time-division multiplexing channel according to one or more specific flag bits of the VPP lighting signal and the SGPIO lighting signal and a preset specific rule.

The above method of transmitting a signal solves the problem of high signal transmission cost caused by an excessive number of cables connected to the hard disk backplane in the related art, thereby reducing the signal transmission cost.

In one exemplary embodiment, a processing unit configured to perform time-division multiplexing encoding/time-division multiplexing decoding is a target processing unit. The target processing unit is configured to schedule and switch, according to signal statuses and signal characteristics of the VPP lighting signal and the SGPIO lighting signal in a signal transmission process, the VPP lighting signal and the SGPIO lighting signal in an orderly time-division way by using the preset time-division multiplexing manner. The VPP lighting signal includes a first clock signal, a first data signal, and an alert signal. The SGPIO lighting signal includes a second clock signal, a second data signal, and a status signal. The first data signal and the second data signal are both transmitted to the target processing unit through respective data links, processed by the target processing unit, and multiplexed into a mixed data channel of the time-division multiplexing channel. The first clock signal and the second clock signal are both transmitted to the target processing unit through respective clock links, processed by the target processing unit, and multiplexed into a mixed clock channel in the time-division multiplexing channel. The alert signal and a status signal are both transmitted to the target processing unit through respective status links, processed by the target processing unit, and multiplexed into a mixed status channel in the time-division multiplexing channel. The target processing unit transmits the processed data signal, clock signal, status signal or alert signal to the target logic device through the time-division multiplexing channel.

In one exemplary embodiment, the operation that the VPP lighting signal and the SGPIO lighting signal are scheduled and switched in an orderly time-division way by using the preset time-division multiplexing manner includes the following operation.

The VPP lighting signal and the SGPIO lighting signal are switched by using the time-division multiplexing manner through a switching module of a physical layer of the target processing unit, so as to be transmitted to the target logic device through the time-division multiplexing channel.

In one exemplary embodiment, the operation that the VPP lighting signal and the SGPIO lighting signal are scheduled and switched in an orderly time-division way by using the preset time-division multiplexing manner includes the following operation.

Information contained in the VPP lighting signal and the SGPIO lighting signal are detected, identified and parsed by a channel layer of the target processing unit, and the VPP lighting signal and the SGPIO lighting signal are switched by using the preset time-division multiplexing manner through the channel layer so as to alternately use the time-division multiplexing channel at respective time intervals, where a set of respective signal code streams is transmitted each time.

In one exemplary embodiment, the operation that the VPP lighting signal and the SGPIO lighting signal are switched by using the preset time-division multiplexing manner through the channel layer so as to alternately use the time-division multiplexing channel at respective time intervals includes the following operations.

The following first channel conduction operation is performed first: the VPP lighting signal is conducted to the time-division multiplexing channel through the switching module of the physical layer, so as to send the VPP lighting signal to the target hard disk backplane, and the SGPIO lighting signal is shielded during this period.

After it is detected that the VPP lighting signal has been sent, a path from the VPP lighting signal to the time-division multiplexing channel is cut off, a code stream of the status signal in the SGPIO lighting signal is detected, and when the code stream is detected to be in a specific status, the following second channel conduction operation is performed: a control signal set conducted to the time-division multiplexing channel is switched to the SGPIO lighting signal through the switching module of the physical layer, so as to send the SGPIO lighting signal within one data cycle to the target hard disk backplane.

After it is determined that the SGPIO lighting signal within the current data cycle has been sent by detecting the status signal in SGPIO lighting signal to be a specific code stream, a path from the SGPIO lighting signal to the time-division multiplexing channel is cut off. The time-division multiplexing channel is in a disabled status, and no signal is currently transmitted in the time-division multiplexing channel.

Signal detection is performed on the first clock signal within a preset time, and it is determined whether to perform the first channel conduction operation or the second channel conduction operation based on a signal detection result of the first clock signal.

The process is repeated in this way, and the VPP lighting signal and the SGPIO lighting signal are alternately transmitted to the time-division multiplexing channel.

In one exemplary embodiment, after the following first channel conduction operation is performed first, the method further includes the following operations.

A signal level of the first data signal within each first clock cycle is detected, where the first clock cycle is a clock cycle of the first clock signal.

It is determined that the VPP lighting signal has been sent in a case of detecting the signal level of the first data signal within M consecutive first clock cycles to be a first preset level, where M is a positive integer greater than or equal to 1.

In one exemplary embodiment, after the following first channel conduction operation is performed first, the method further includes the following operation.

After it is detected that the VPP lighting signal has been sent, the conduction of the VPP lighting signal to the time-division multiplexing channel is stopped.

In one exemplary embodiment, before the following second channel conduction operation is performed, the method further includes the following operations.

A signal level of the status signal in the SGPIO lighting signal within each second clock cycle is detected, where the second clock cycle is a clock cycle of the second clock signal.

The code stream of the status signal is determined to be in the specific status in a case of detecting the signal level of the status signal within N consecutive second clock cycles to be a second preset level, where N is a positive integer greater than or equal to 1, and the status signal is configured to indicate a starting position of the second data signal within one data cycle.

In one exemplary embodiment, the SGPIO lighting signal within one data cycle starts to be transmitted within the next clock cycle of the second clock signal after a rising edge of the status signal.

In one exemplary embodiment, the operation that it is determined whether to perform the first channel conduction operation or the second channel conduction operation based on a signal detection result of the first clock signal includes the following operations.

In a case where the signal detection result of the first clock signal is configured to indicate that the first clock signal changes within the preset time, it is determined to perform the first channel conduction operation.

In a case where the signal detection result of the first clock signal is configured to indicate that the first clock signal does not change within the preset time, it is determined to perform the second channel conduction operation.

In one exemplary embodiment, the operation that the VPP lighting signal and the SGPIO lighting signal are scheduled and switched in an orderly time-division way by using the preset time-division multiplexing manner includes the following operations.

A switching cycle and a switching frequency of the time-division multiplexing channel are adapted according to the code stream characteristics of the VPP lighting signal and the SGPIO lighting signal, so as to meet the requirements for sampling rates of original data of the VPP lighting signal and the SGPIO lighting signal.

Under the setting of the current preset time, a data layer of the target processing unit performs data sampling on the VPP lighting signal and the SGPIO lighting signal switched by using the time-division multiplexing manner at a sampling rate of 10 times/s, and transmits the obtained sampled data to the target logic device through the time-division multiplexing channel.

In one exemplary embodiment, each of the VPP lighting signal and the SGPIO lighting signal contains indication information of hard disk status, and an activity bit corresponding to an active status of the corresponding hard disk, a fault bit corresponding to fault reporting of the corresponding hard disk, and a location bit corresponding to a location status of the corresponding hard disk are obtained by parsing the indication information of hard disk status.

When a combination of bit values on the activity bit, the fault bit, and the location bit is a first value, the indication information of hard disk status is configured to indicate that the corresponding hard disk is in the active status.

When the combination of the bit values on the activity bit, the fault bit, and the location bit is a second value, the indication information of hard disk status is configured to indicate that the corresponding hard disk is not in the active status.

When the combination of the bit values on the activity bit, the fault bit, and the location bit is a third value, the indication information of hard disk status is configured to indicate that the corresponding hard disk is not in any of a hard disk fault status, a hard disk location status, and a hard disk rebuild status.

When the combination of the bit values on the activity bit, the fault bit, and the location bit is a fourth value, the indication information of hard disk status is configured to indicate that the corresponding hard disk is in the hard disk fault status.

When the combination of the bit values on the activity bit, the fault bit, and the location bit is a fifth value, the indication information of hard disk status is configured to indicate that the corresponding hard disk is in the hard disk location status.

When the combination of the bit values on the activity bit, the fault bit, and the location bit is a sixth value, the indication information of hard disk status is configured to indicate that the corresponding hard disk is in the hard disk rebuild status.

In one exemplary embodiment, after the VPP lighting signal and the SGPIO lighting signal are scheduled and switched in an orderly time-division way by using the preset time-division multiplexing manner, the above method further includes the following operations.

A target lighting signal is received, where the target lighting signal is any one of the VPP lighting signal and the SGPIO lighting signal, and the target lighting signal is a lighting signal of a target status indicator lamp corresponding to a target hard disk inserted into a target hard disk slot in the set of hard disk slots.

indication information of target status corresponding to the target hard disk is extracted from the target lighting signal, where the indication information of target status is configured to indicate a hard disk status of the target hard disk.

A display status of the target status indicator lamp is controlled according to the hard disk status indicated by the indication information of target status in combination with an inserted status of the target hard disk.

In one exemplary embodiment, the target status indicator lamp may contain: a first indicator lamp corresponding to the inserted status and the active status of the target hard disk, and a second indicator lamp corresponding to the fault reporting status, the location status, and the rebuild status (namely, the hard disk fault status, the hard disk location status, and the hard disk rebuild status) of the target hard disk.

The operation that a display status of the target status indicator lamp is controlled according to the hard disk status indicated by the indication information of target status in combination with an inserted status of the target hard disk includes the following operations.

The first indicator lamp is controlled to be in an off status in a case where the target hard disk is not inserted (namely, the inserted status indicates that the target hard disk is not inserted).

The first indicator lamp is controlled to be in an on status in a case where the target hard disk is inserted (namely, the inserted status indicates that the target hard disk is inserted), and not in the active status.

The first indicator lamp is controlled to be in a blinking status of blinking at a first frequency in a case where the target hard disk is inserted (namely, the inserted status indicates that the target hard disk is inserted), and the active status.

The first indicator lamp is controlled to be in the blinking status of blinking at the first frequency in a case where the target hard disk is in the hard disk location status, and the second indicator lamp is controlled to be in the blinking status of blinking at the first frequency.

The second indicator lamp is controlled to be in an on status in a case where the target hard disk is in the hard disk fault status.

The second indicator lamp is controlled to be in a blinking status of blinking at a second frequency in a case where the target hard disk is in the hard disk rebuild status.

In one exemplary embodiment, before the display status of the target status indicator lamp is controlled according to the hard disk status indicated by the indication information of target status in combination with the inserted status of the target hard disk, the above method further includes the following operations.

A status indication signal corresponding to the target hard disk is received through a physical cable different from the lighting cable that transmits the VPP lighting signal and the SGPIO lighting signal, where the status indication signal is configured to indicate the inserted status of the target hard disk.

In response to the received status indication signal, the inserted status indicated by inserted status indication information in the status indication signal is determined to be the inserted status of the target hard disk.

In one exemplary embodiment, before the VPP lighting signal and the SGPIO lighting signal to be transmitted to the target logic device on the target hard disk backplane are acquired, the above method further includes the following operations.

The hard disk status of each NVMe hard disk in the set of NVMe hard disks inserted in the set of hard disk slots is detected by a central controller of a server motherboard.

In a case where a target NVMe hard disk whose hard disk status is updated exists in the set of NVMe hard disks, the VPP lighting signal is generated according to the hard disk status of the target NVMe hard disk. The VPP lighting signal is configured to indicate the updated hard disk status of the target NVMe hard disk, and the VPP lighting signal carries target address information of the target NVMe hard disk and target lighting information of the status indicator lamp corresponding to the target NVMe hard disk, and each of a plurality of first bits in the target lighting information corresponds to a hard disk status parameter.

In one exemplary embodiment, the operation that in a case where a target NVMe hard disk whose hard disk status is updated exists in the set of NVMe hard disks, the VPP lighting signal is generated according to the hard disk status of the target NVMe hard disk includes the following operation.

In a case where the target NVMe hard disk whose hard disk status is updated exists in the set of NVMe hard disks, a first sub-VPP lighting signal carrying the target address information is generated according to address information of the target NVMe hard disk, and a second sub-VPP lighting signal carrying the target lighting information is generated according to the hard disk status of the target NVMe hard disk. The first sub-VPP lighting signal includes fixed bits and hard disk address bits, the fixed bits contain a first number of bits, and the hard disk address bits contain a second number of bits.

In one exemplary embodiment, before the VPP lighting signal and the SGPIO lighting signal to be transmitted to the target logic device on the target hard disk backplane are acquired, the above method further includes the following operations.

A hard disk status of each SATA hard disk in a set of SATA hard disks inserted in the set of hard disk slots is detected by a SATA controller of the server motherboard.

The SGPIO lighting signal is generated according to the hard disk status of each SATA hard disk, where the SGPIO lighting signal is a lighting signal of the status indicator lamp corresponding to each SATA hard disk, and the SGPIO lighting signal is configured to sequentially indicate the hard disk status of each SATA hard disk.

In one exemplary embodiment, after the SGPIO lighting signal is generated according to the hard disk status of each SATA hard disk, the above method further includes the following operation.

Data code streams are continuously polled and sent by the SATA controller. Each set of data code streams sent by the SATA controller contains lighting information of the status indicator lamp corresponding to each SATA hard disk.

It is to be noted that, for simple description, each of the above method embodiments is expressed as a combination of a series of operations, but those skilled in the art should know that the present disclosure is not limited to the described operation sequence because some steps may be executed in other sequences or at the same time according to the present disclosure. Second, those skilled in the art should also know that all the embodiments described in the specification are optional embodiments and involved operations and modules are not always required by the present disclosure.

Through the above description of implementations, those skilled in the art may clearly know that the method according to the above embodiments may be implemented by means of software plus a necessary common hardware platform, certainly by means of hardware; but in many cases, the former is the better implementation. Based on such understanding, the technical solution of the embodiments of the present disclosure, which is essential or contributes to the conventional art, may be embodied in the form of a software product. The computer software product is stored in a non-volatile readable storage medium (such as a Read-Only Memory (ROM)/Random Access Memory (RAM), a magnetic disk and an optical disc), including a number of instructions for causing a terminal device (which may be a mobile phone, a computer, a server, or a network device, etc.) to perform the methods described in various embodiments of the present disclosure.

According to still another aspect of the embodiments of the present disclosure further provide an electronic apparatus, which includes a memory and a processor. The memory stores a computer program. The processor is configured to run the computer program to execute the steps in any of the above method embodiments.

The optional examples in the present embodiment may refer to the above embodiments and the examples described in the optional implementations, which will not be elaborated herein.

It is apparent that those skilled in the art should understand that the above modules and steps of the embodiments of the present disclosure may be implemented by a general-purpose computing apparatus, and may also be gathered together on a single computing apparatus or distributed in a network composed of a plurality of computing apparatuses. The above modules or steps of the embodiments of the present disclosure may be implemented with program codes executable by the computing apparatus, so that they may be stored in a storage apparatus for execution by the computing apparatus, and in some cases, the steps shown or described may be executed in an order different from that described here, or may be fabricated into individual integrated circuit modules respectively, or a plurality of modules or steps thereof are fabricated into a single integrated circuit module for implementation. In this way, the embodiments of the present disclosure are not limited to any particular combination of hardware and software.

The above are only the optional embodiments of the present disclosure, and are not intended to limit the embodiments of the present disclosure, and for those of ordinary skill in the art, various modifications and changes may be made to the embodiments of the present disclosure. Any modifications, equivalent substitutions, improvements and the like made within the principle of the embodiments of the present disclosure shall fall within the scope of protection of the embodiments of the present disclosure.

The invention claimed is:

1. A system of transmitting a signal, comprising: a server motherboard and a hard disk backplane, wherein the hard disk backplane is deployed with a target logic device and a set of hard disk slots, the target logic device is a logic device configured to control a hard disk inserted into each hard disk slot within the set of hard disk slots, and the server motherboard is connected to the hard disk backplane through a cable, wherein, the server motherboard is configured to acquire a Virtual Pin Port (VPP) lighting signal to be transmitted to the target logic device and a Serial General Purpose Input/Output (SGPIO) lighting signal to be transmitted to the target logic device, wherein the VPP lighting signal is a lighting signal corresponding to a Non Volatile Memory express (NVMe) hard disk inserted into a hard disk slot in the set of hard disk slots, and the SGPIO lighting signal is a lighting signal corresponding to a Serial Advanced Technology Attachment (SATA) hard disk inserted into a hard disk slot in the set of hard disk slots; and the server motherboard is configured to schedule and switch the VPP lighting signal and the SGPIO lighting signal in an orderly time-division way by using a preset time-division multiplexing manner, so as to transmit the VPP lighting signal and the SGPIO lighting signal to the target logic device through a same lighting cable, wherein the preset time-division multiplexing manner comprises: continuously detecting the VPP lighting signal and the SGPIO lighting signal to be transmitted to the target logic device within a time-division multiplexing cycle to identify whether the VPP lighting signal or the SGPIO lighting signal is to be transmitted to the target logic device based on respective waveform characteristics of the VPP lighting signal and the SGPIO lighting signal, sampling the VPP lighting signal and the SGPIO lighting signal which are continuously sent, and switching the VPP lighting signal and the SGPIO lighting signal to be alternately transmitted to a time-division multiplexing channel according to one or more specific flag bits of each of the VPP lighting signal and the SGPIO lighting signal and a preset specific rule; and the target logic device is configured to receive the VPP lighting signal and the SGPIO lighting signal, which are transmitted by the server motherboard through the lighting cable, by using the preset time-division multiplexing manner, and the target logic device is configured to control a display status of a status indicator lamp corresponding to the NVMe hard disk inserted into a hard disk slot in the set of hard disk slots based on the VPP lighting signal, and control a display status of a status indicator lamp corresponding to the SATA hard disk inserted into a hard disk slot in the set of hard disk slots based on the SGPIO lighting signal.

2. The system of transmitting the signal according to claim 1, wherein, in the server motherboard, a processing unit configured to perform time-division multiplexing encoding/time-division multiplexing decoding is a target processing unit, wherein the target processing unit is configured to schedule and switch, according to signal statuses and signal characteristics of the VPP lighting signal and the SGPIO lighting signal in a signal transmission process, the VPP lighting signal and the SGPIO lighting signal in an orderly time-division way by using the preset time-division multiplexing manner; the VPP lighting signal comprises a first clock signal, a first data signal, and an alert signal; the SGPIO lighting signal comprises a second clock signal, a second data signal, and a status signal; the first data signal and the second data signal are both transmitted to the target processing unit through respective data links of the first data signal and the second data signal, after the first data signal and the second data signal are processed by the target processing unit, a processed first data signal and a processed second data signal are transmitted to a mixed data channel in the time-division multiplexing channel; the first clock signal and the second clock signal are both transmitted to the target processing unit through respective clock links of the first clock signal and the second clock signal, after the first clock signal and the second clock signal are processed by the target processing unit, a processed first clock signal and a processed second clock signal are transmitted to a mixed clock channel in the time-division multiplexing channel; the alert signal and the status signal are both transmitted to the target processing unit through respective status links of the alert signal and the status signal, after the alert signal and the status signal are processed by the target processing unit, a processed alert signal and a processed status signal are transmitted to a mixed status channel in the time-division multiplexing channel; and the target processing unit is configured to transmit the processed first data signal and the processed second data signal, the processed first clock signal and the processed second clock signal, the processed status signal or the processed alert signal to the target logic device through the time-division multiplexing channel.

3. The system of transmitting the signal according to claim 2, wherein the target processing unit comprises a physical layer, and the physical layer is deployed with a switching module, wherein, the switching module is configured to switch the VPP lighting signal and the SGPIO lighting signal by using the time-division multiplexing manner, so as to alternately transmit the VPP lighting signal and the SGPIO lighting signal to the target logic device through the time-division multiplexing channel.

4. The system of transmitting the signal according to claim 3, wherein the target processing unit further comprises a channel layer, wherein, the channel layer of the target processing unit is configured to detect, identify and parse information comprised in the VPP lighting signal and the SGPIO lighting signal, and switch the VPP lighting signal and the SGPIO lighting signal by using the preset time-division multiplexing manner so as to alternately use the time-division multiplexing channel at respective time intervals of the VPP lighting signal and the SGPIO lighting signal, wherein a set of signal code streams of the VPP lighting signal or the SGPIO lighting signal is transmitted each time.

5. The system of transmitting the signal according to claim 4, wherein the channel layer is further configured to execute the following steps:

first, performing a following first channel conduction operation: conducting the VPP lighting signal to the time-division multiplexing channel through the switching module of the physical layer, so as to send the VPP lighting signal to the hard disk backplane, and shielding the SGPIO lighting signal during this period;

after it is detected that the VPP lighting signal has been sent to the hard disk backplane, cutting off a path from the VPP lighting signal to the time-division multiplexing channel, detecting a code stream of the status signal in the SGPIO lighting signal, and when the code stream is detected to be in a specific status, performing a following second channel conduction operation: switching a control signal set conducted to the time-division multiplexing channel to the SGPIO lighting signal through the switching module of the physical layer, so as to send the SGPIO lighting signal within one data cycle to the hard disk backplane;

after it is determined that the SGPIO lighting signal within the current data cycle has been sent by detecting the status signal in the SGPIO lighting signal to be a specific code stream, cutting off a path from the SGPIO lighting signal to the time-division multiplexing channel, wherein the time-division multiplexing channel is in a disabled status, and no signal is currently transmitted in the time-division multiplexing channel;

detecting the first clock signal within a preset time, and determining whether to perform the first channel conduction operation or the second channel conduction operation based on a signal detection result of the first clock signal; and repeating above steps to alternately transmit the VPP lighting signal and the SGPIO lighting signal to the time-division multiplexing channel.

6. The system of transmitting the signal according to claim 5, wherein the channel layer is further configured to detect a signal level of the first data signal within each first clock cycle after performing the first channel conduction operation, wherein the first clock cycle is a clock cycle of the first clock signal; and determine that the VPP lighting signal has been sent in a case of detecting the signal level of the first data signal within M consecutive first clock cycles to be a first preset level, wherein M is a positive integer greater than or equal to 1.

7. The system of transmitting the signal according to claim 5, wherein the channel layer is further configured to stop, after performing the first channel conduction operation, transmitting the VPP lighting signal to the time-division multiplexing channel when it is detected that the VPP lighting signal has been sent.

8. The system of transmitting the signal according to claim 5, wherein the channel layer is further configured to detect, before performing the second channel conduction operation, a signal level of the status signal in the SGPIO lighting signal within each second clock cycle, wherein the second clock cycle is a clock cycle of the second clock signal; and determine the code stream of the status signal to be in the specific status in a case of detecting the signal level of the status signal within N consecutive second clock cycles to be a second preset level, wherein N is a positive integer greater than or equal to 1, and the status signal is configured to indicate a starting position of the second data signal within one data cycle.

9. The system of transmitting the signal according to claim 8, wherein the SGPIO lighting signal within one data cycle starts to be transmitted within a next clock cycle of the second clock signal after a rising edge of the status signal.

10. The system of transmitting the signal according to claim 5, wherein the channel layer is further configured to determine whether to perform the first channel conduction operation or the second channel conduction operation based on the signal detection result of the first clock signal through following steps: in a case where the signal detection result of the first clock signal is configured to indicate that the first clock signal changes within the preset time, determining to perform the first channel conduction operation; and in a case where the signal detection result of the first clock signal is configured to indicate that the first clock signal does not change within the preset time, determining to perform the second channel conduction operation.

11. The system of transmitting the signal according to claim 5, wherein the target processing unit further comprises a data layer, wherein, the data layer is configured to adapt a switching cycle and a switching frequency of the time-division multiplexing channel according to a code stream characteristic of the VPP lighting signal and a code stream characteristic of the SGPIO lighting signal, so as to meet requirements for a sampling rate of original data of the VPP lighting signal and a sampling rate of original data of the SGPIO lighting signal; and perform data sampling, under the setting of the current preset time, on the VPP lighting signal and the SGPIO lighting signal switched by using the time-division multiplexing manner at a sampling rate of 10 times/s, and transmit obtained sampled data to the target logic device through the time-division multiplexing channel.

12. The system of transmitting the signal according to claim 2, wherein each of the VPP lighting signal and the SGPIO lighting signal comprises indication information of a hard disk status, and an activity bit corresponding to an active status of a corresponding hard disk, a fault bit corresponding to fault reporting of the corresponding hard disk, and a location bit corresponding to a location status of the corresponding hard disk, wherein the activity bit, the fault bit and the location bit are obtained by parsing the indication information of hard disk status, wherein, when a combination of bit values on the activity bit, the fault bit, and the location bit is a first value, the indication information of the hard disk status is configured to indicate that the corresponding hard disk is in the active status;

when the combination of the bit values on the activity bit, the fault bit, and the location bit is a second value, the indication information of the hard disk status is configured to indicate that the corresponding hard disk is not in the active status;

when the combination of the bit values on the activity bit, the fault bit, and the location bit is a third value, the indication information of the hard disk status is configured to indicate that the corresponding hard disk is not in any of a hard disk fault status, a hard disk location status, and a hard disk rebuild status;

when the combination of the bit values on the activity bit, the fault bit, and the location bit is a fourth value, the indication information of the hard disk status is configured to indicate that the corresponding hard disk is in the hard disk fault status;

when the combination of the bit values on the activity bit, the fault bit, and the location bit is a fifth value, the indication information of the hard disk status is configured to indicate that the corresponding hard disk is in the hard disk location status; and when the combination of the bit values on the activity bit, the fault bit, and the location bit is a sixth value, the indication information of the hard disk status is configured to indicate that the corresponding hard disk is in the hard disk rebuild status.

13. The system of transmitting the signal according to claim 1, wherein the target logic device is further configured to receive a target lighting signal, wherein the target lighting signal is any one of the VPP lighting signal and the SGPIO lighting signal, and the target lighting signal is a lighting signal of a target status indicator lamp corresponding to a target hard disk inserted into a target hard disk slot in the set of hard disk slots; extract target status indication information corresponding to the target hard disk from the target lighting signal, wherein the target status indication information is configured to indicate a hard disk status of the target hard disk; and control a display status of the target status indicator lamp according to the hard disk status indicated by the target status indication information in combination with an inserted status of the target hard disk.

14. The system of transmitting the signal according to claim 13, wherein the target status indicator lamp comprises: a first indicator lamp corresponding to the inserted status and the active status of the target hard disk, and a second indicator lamp corresponding to a hard disk fault status, a hard disk location status, and a hard disk rebuild status of the target hard disk;

the controlling a display status of the target status indicator lamp according to the hard disk status indicated by the target status indication information in combination with an inserted status of the target hard disk comprises:

in a case where the inserted status indicates that the target hard disk is not inserted, controlling the first indicator lamp to be in an off status;

in a case where the inserted status indicates that the target hard disk is inserted, and the target hard disk is not in the active status, controlling the first indicator lamp to be in an on status;

in a case where the inserted status indicates that the target hard disk is inserted, and the target hard disk is in the active status, controlling the first indicator lamp to be in a blinking status of blinking at a first frequency;

in a case where the target hard disk is in the hard disk location status, controlling the first indicator lamp to be in the blinking status of blinking at the first frequency, and controlling the second indicator lamp to be in the blinking status of blinking at the first frequency;

in a case where the target hard disk is in the hard disk fault status, controlling the second indicator lamp to be in an on status; and in a case where the target hard disk is in the hard disk rebuild status, controlling the second indicator lamp to be in a blinking status of blinking at a second frequency.

15. The system of transmitting the signal according to claim 14, wherein the target logic device is further configured to receive a status indication signal corresponding to the target hard disk through a physical cable different from the lighting cable that transmits the VPP lighting signal and the SGPIO lighting signal, wherein the status indication signal is configured to indicate the inserted status of the target hard disk; and the target logic device is configured to determine, in response to the received status indication signal, the inserted status indicated by inserted status indication information in the status indication signal to be the inserted status of the target hard disk.

16. The system of transmitting the signal according to claim 1, wherein the server motherboard comprises:

a central controller, configured to detect a hard disk status of each NVMe hard disk in a set of NVMe hard disks inserted into the set of hard disk slots; and generate, in a case where a target NVMe hard disk whose hard disk status is updated exists in the set of NVMe hard disks, the VPP lighting signal according to the hard disk status of the target NVMe hard disk, wherein the VPP lighting signal is configured to indicate the updated hard disk status of the target NVMe hard disk, and the VPP lighting signal carries target address information of the target NVMe hard disk and target lighting information of a status indicator lamp corresponding to the target NVMe hard disk, and each of a plurality of first bits in the target lighting information corresponds to one hard disk status parameter.

17. The system of transmitting the signal according to claim 16, wherein the central controller is further configured to generate, in a case where the target NVMe hard disk whose hard disk status is updated exists in the set of NVMe hard disks, a first sub-VPP lighting signal carrying the target address information according to address information of the target NVMe hard disk, and generate a second sub-VPP lighting signal carrying the target lighting information according to the hard disk status of the target NVMe hard disk, wherein the first sub-VPP lighting signal comprises one or more fixed bits and one or more hard disk address bits, the one or more fixed bits comprise a first number of bits, and the one or more hard disk address bits comprise a second number of bits.

18. The system of transmitting the signal according to claim 1, wherein the server motherboard further comprises:

a SATA controller, configured to detect a hard disk status of each SATA hard disk in a set of SATA hard disks inserted in the set of hard disk slots; and generate the SGPIO lighting signal according to the hard disk status of each SATA hard disk in the set of SATA hard disks, wherein the SGPIO lighting signal is a lighting signal of the status indicator lamp corresponding to each SATA hard disk in the set of SATA hard disks, and the SGPIO lighting signal is configured to sequentially indicate the hard disk status of each SATA hard disk in the set of SATA hard disks.

19. The system of transmitting the signal according to claim 18, wherein the SATA controller is further configured to continuously poll and send data code streams, wherein each set of data code streams sent by the SATA controller comprises lighting information of the status indicator lamp corresponding to each SATA hard disk in the set of SATA hard disks.

20. A method of transmitting a signal, comprising:

acquiring a Virtual Pin Port (VPP) lighting signal and a Serial General Purpose Input/Output (SGPIO) lighting signal to be transmitted to a target logic device on a hard disk backplane, wherein the target logic device is a logic device configured to control a hard disk inserted into a hard disk slot in a set of hard disk slots on the hard disk backplane, the VPP lighting signal is a lighting signal corresponding to a Non Volatile Memory express (NVMe) hard disk inserted into a hard disk slot in the set of hard disk slots, and the SGPIO lighting signal is a lighting signal corresponding to a Serial Advanced Technology Attachment (SATA) hard disk inserted into a hard disk slot in the set of hard disk slots; and scheduling and switching the VPP lighting signal and the SGPIO lighting signal in an orderly time-division way by using a preset time-division multiplexing manner, so as to transmit the VPP lighting signal and the SGPIO lighting signal to the target logic device through a same lighting cable, wherein the preset time-division multiplexing manner comprises: continuously detecting the VPP lighting signal and the SGPIO lighting signal within a time-division multiplexing cycle, performing identification and determination according to waveform characteristics of the VPP lighting signal and the SGPIO lighting signal, sampling the VPP lighting signal and the SGPIO lighting signal which are continuously sent, and switching the VPP lighting signal and the SGPIO lighting signal to be alternately transmitted to a time-division multiplexing channel according to one or more specific flag bits of the VPP lighting signal and the SGPIO lighting signal and a preset specific rule.

* * * * *